(12) United States Patent
Nakata et al.

(10) Patent No.: US 11,770,068 B2
(45) Date of Patent: Sep. 26, 2023

(54) SWITCHING POWER SUPPLY DEVICE

(71) Applicant: Panasonic Intellectual Property Management Co., Ltd., Osaka (JP)

(72) Inventors: Hideki Nakata, Kanagawa (JP); Atsushi Seki, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/667,324

(22) Filed: Feb. 8, 2022

(65) Prior Publication Data

US 2022/0255453 A1 Aug. 11, 2022

(30) Foreign Application Priority Data

Feb. 10, 2021 (JP) ................. 2021-020213

(51) Int. Cl.
*H02M 1/42* (2007.01)
*H02M 1/36* (2007.01)
*H02M 7/12* (2006.01)
*H02M 1/00* (2006.01)
*H02M 7/155* (2006.01)
*H02M 7/162* (2006.01)

(52) U.S. Cl.
CPC ....... *H02M 1/4233* (2013.01); *H02M 1/0085* (2021.05); *H02M 1/36* (2013.01); *H02M 7/125* (2013.01); *H02M 1/0083* (2021.05); *H02M 7/1555* (2013.01); *H02M 7/1626* (2013.01)

(58) Field of Classification Search
CPC .... H02M 1/4233; H02M 1/0083; H02M 1/36; H02M 7/125; H02M 7/1555; H02M 7/1557; H02M 7/1626
See application file for complete search history.

(56) References Cited

U.S. PATENT DOCUMENTS

2015/0131343 A1  5/2015  Hufnagel et al.
2018/0166910 A1  6/2018  Sun et al.
2021/0336533 A1* 10/2021 Benabdelaziz ..... H02M 1/4208

FOREIGN PATENT DOCUMENTS

EP    3349343 A1    7/2018
JP    2015-033170 A  2/2015
JP    2018-102117 A  6/2018

\* cited by examiner

*Primary Examiner* — Jue Zhang
(74) *Attorney, Agent, or Firm* — Seed IP Law Group LLP

(57) ABSTRACT

In a switching power supply device, a control circuit controls a first thyristor, a second thyristor, and a switching element according to an input voltage. The control circuit maintains the first thyristor in an on state while maintaining the second thyristor and the switching element in an off state in a first period in which the absolute amplitude value is equal to or less than a first threshold value within the latter half of a first half-cycle of the input voltage at startup, and maintains the second thyristor in an on state while maintaining the first thyristor and the switching element in an off state in a second period in which the absolute amplitude value is equal to or less than a second threshold value within the latter half of a second half-cycle of the input voltage at startup. The second half-cycle is the half-cycle following the first half-cycle.

19 Claims, 21 Drawing Sheets

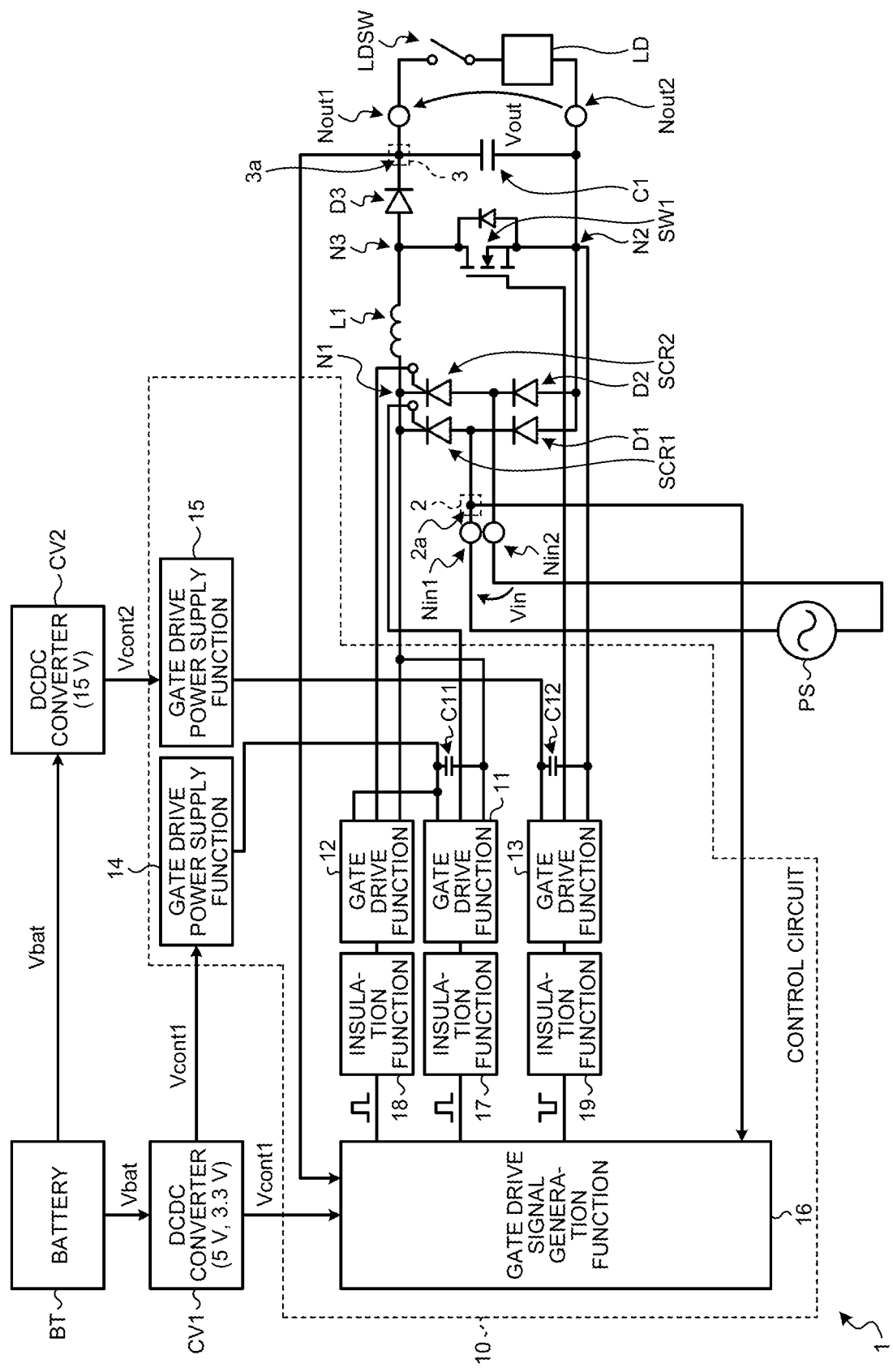

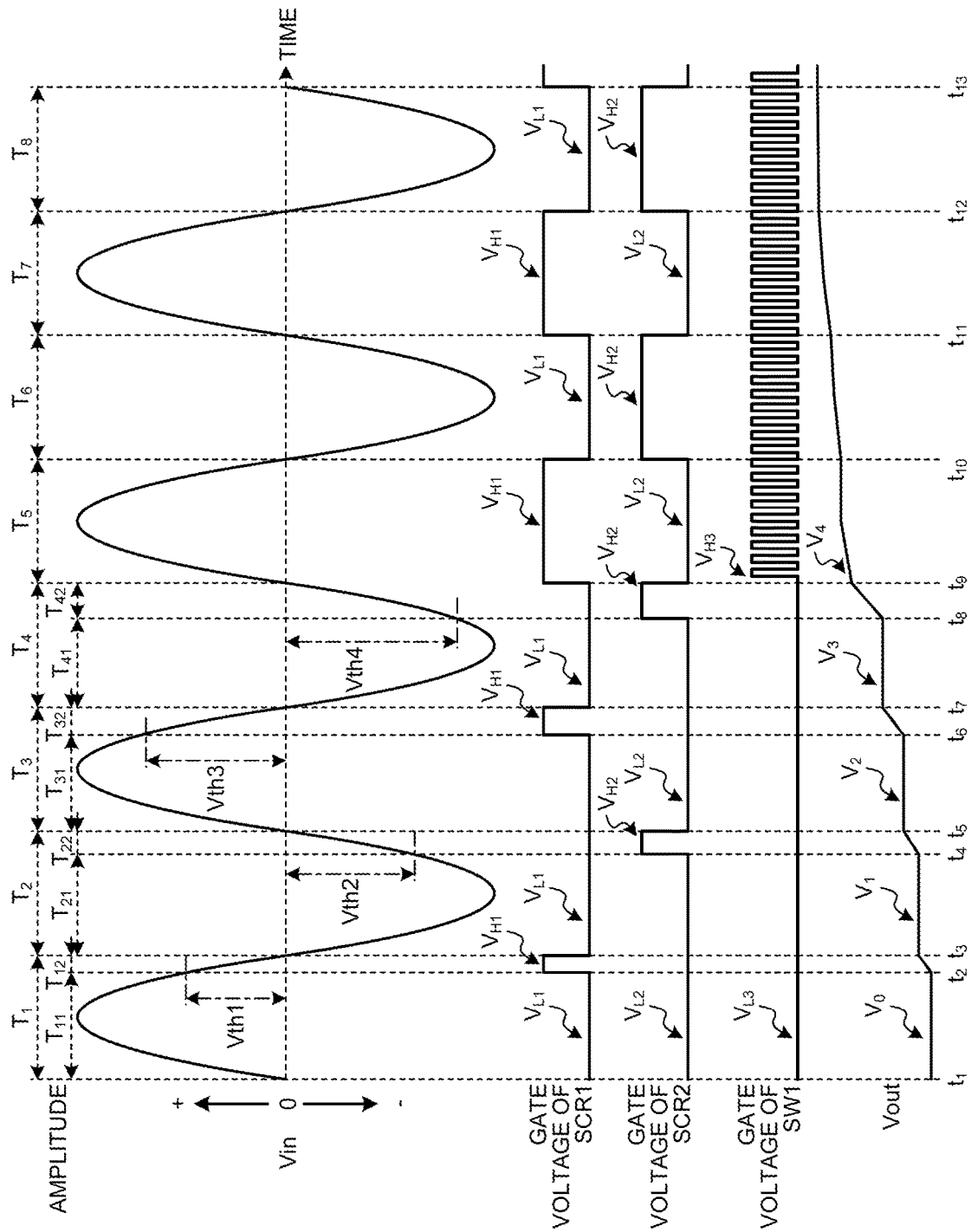

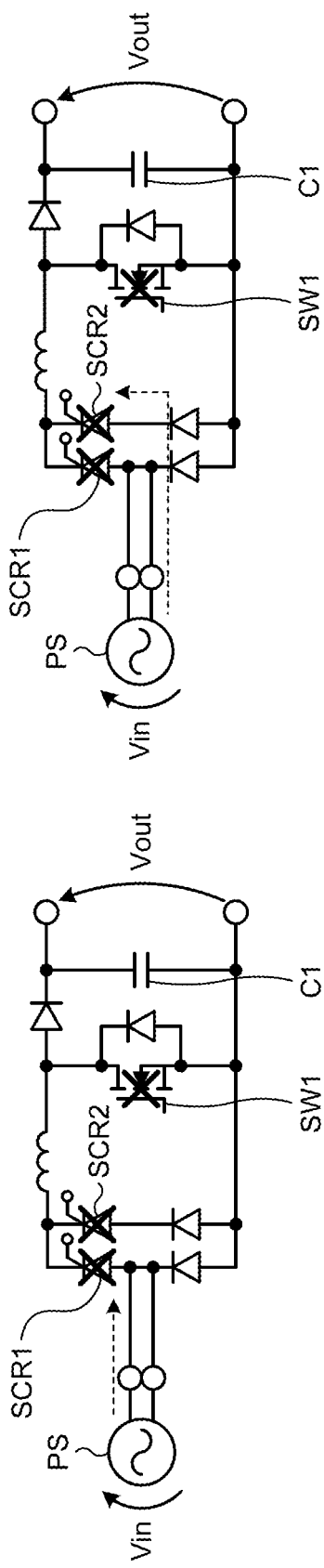
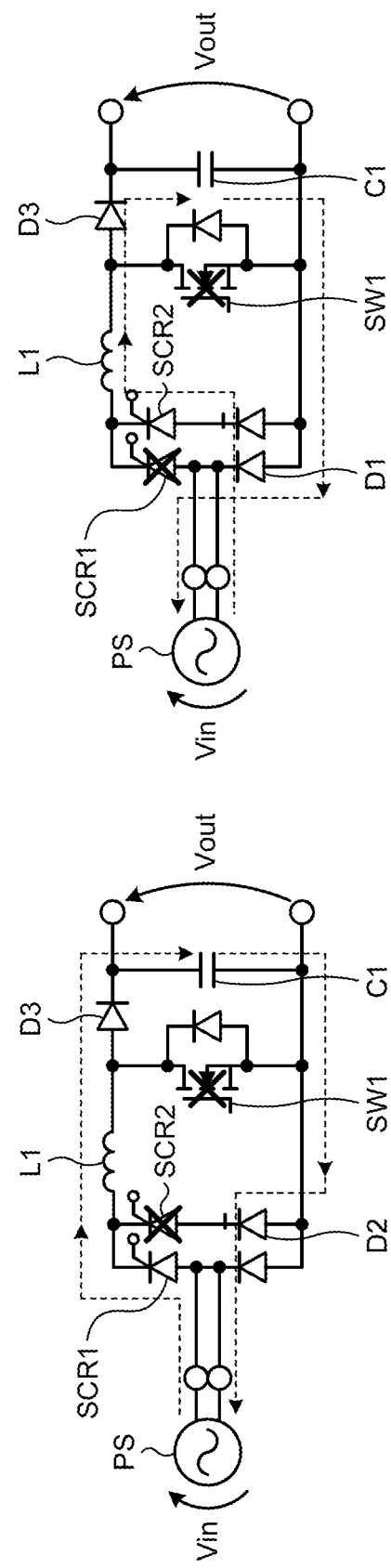

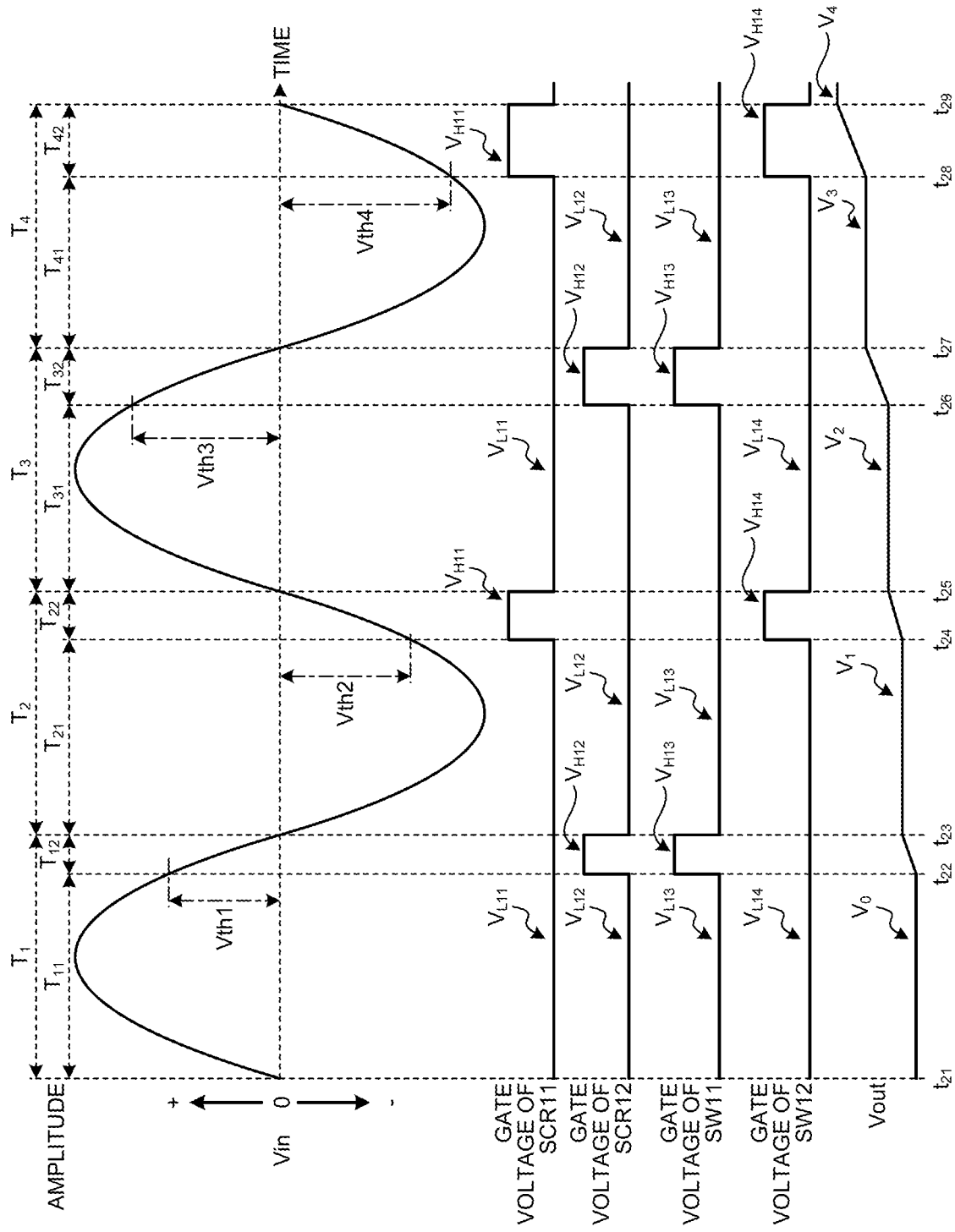

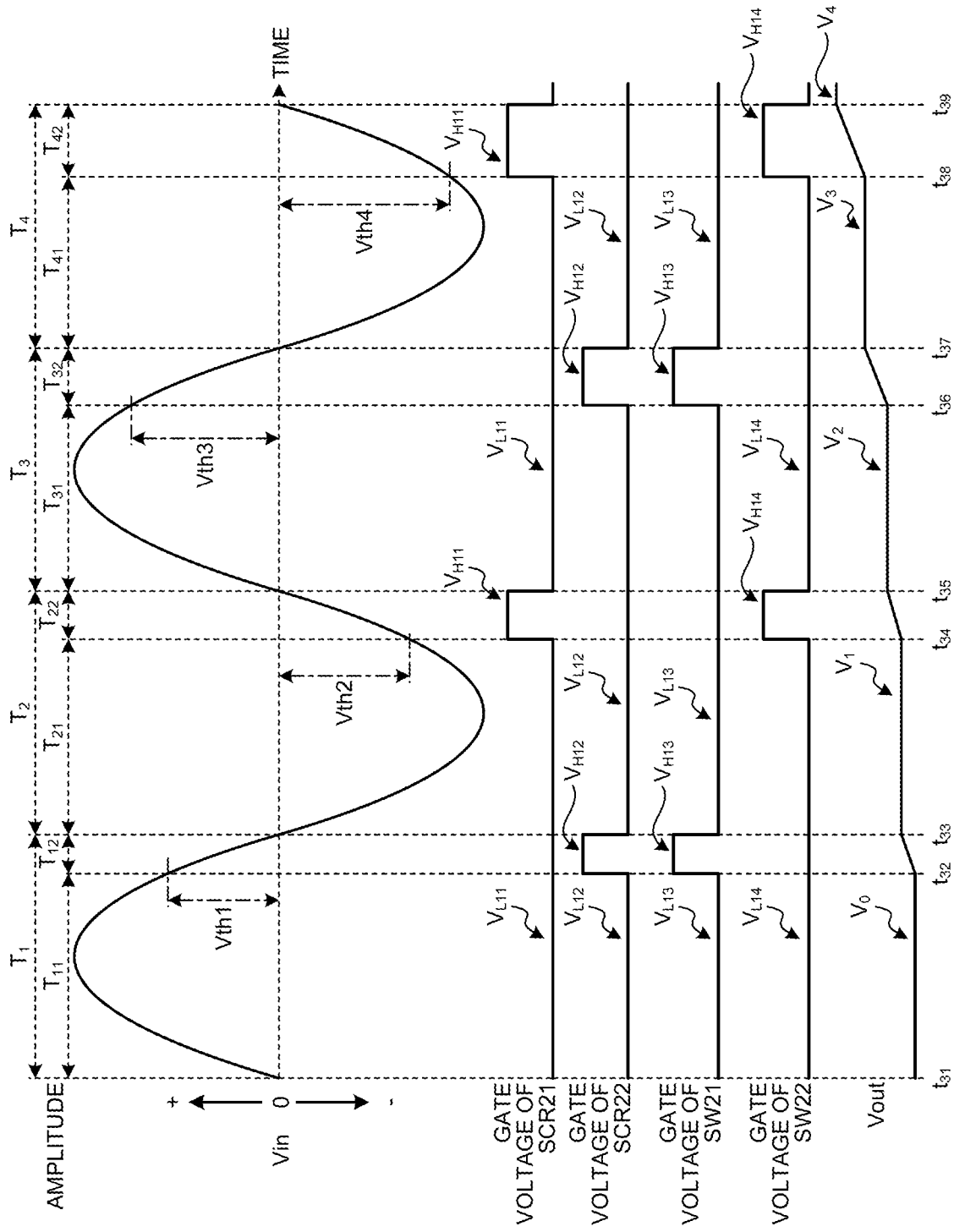

SWITCHING POWER SUPPLY DEVICE

CROSS-REFERENCE TO RELATED APPLICATIONS

This application is based upon and claims the benefit of priority from Japanese Patent Application No. 2021-020213, filed on Feb. 10, 2021, the entire contents of which are incorporated herein by reference.

FIELD

The present disclosure relates to a switching power supply device.

BACKGROUND

A switching power supply device arranged between an AC power supply and a load circuit converts the AC power received from the AC power supply into DC power and outputs the same to the load circuit (see, for example, EP 3349343 A).

In the switching power supply device, an inrush current may be generated because a capacitive element on the output side is not charged at startup when the supply of AC power by the AC power supply starts. At this time, it is desired that the switching power supply device suppress the inrush current by simple control.

The present disclosure provides a switching power supply device capable of suppressing an inrush current with simple control.

SUMMARY

A switching power supply device includes a first thyristor, a second thyristor, a first diode, a second diode, an induction element, a third diode, a switching element, a capacitive element, a detector, and a control circuit. The first thyristor is connected between a first input node and a first node. The second thyristor connected between a second input node and the first node. The first diode is connected between the first input node and a second node. The second diode is connected between the second input node and the second node. The induction element is connected between the first node and a third node. The third diode is connected between the third node and a first output node. The switching element is connected between the third node and a second output node. The capacitive element is connected between the first output node and the second output node. The detector detects an input voltage received via the first input node and the second input node. The control circuit controls the first thyristor, the second thyristor, and the switching element according to the input voltage. The control circuit maintains the first thyristor in an on state while maintaining the second thyristor and the switching element in an off state in a first period in which an absolute amplitude value is equal to or less than a first threshold value within a latter half of a first half-cycle in the input voltage at startup, and maintains the second thyristor in an on state while maintaining the first thyristor and the switching element in an off state in a second period in which an absolute amplitude value is equal to or less than a second threshold value within a latter half of a second half-cycle following the first half-cycle in the input voltage at startup.

BRIEF DESCRIPTION OF THE DRAWINGS

FIG. 1 is a diagram illustrating a configuration of a switching power supply device according to a first embodiment;

FIG. 2 is a waveform diagram illustrating operations of the switching power supply device according to the first embodiment at startup and steady state;

FIGS. 3A to 3D are diagrams illustrating a startup operation of the switching power supply device according to the first embodiment;

FIG. 8 is a waveform diagram illustrating a startup operation of the switching power supply device according to the second embodiment;

FIG. 16 is a waveform diagram illustrating a startup operation of the switching power supply device according to the third embodiment;

DETAILED DESCRIPTION

Figure 4C:
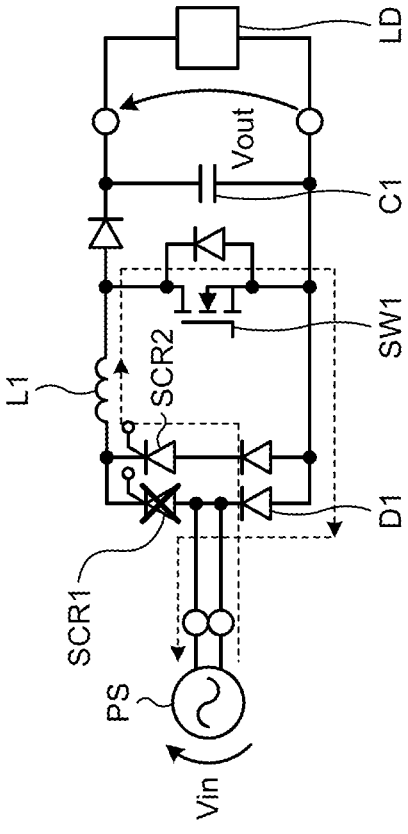
FIGS. 4A to 4D are diagrams illustrating a steady-state operation of the switching power supply device according to the first embodiment.

Hereinafter, embodiments of the switching power supply device according to the present disclosure will be described with reference to the drawings.

First Embodiment

The switching power supply device according to the first embodiment is arranged between an AC power supply and a load circuit, converts the AC power received from the AC power supply into DC power, and outputs the DC power to the load circuit. At this time, the switching power supply device uses a PFC (Power Factor Correction) circuit in order to convert AC power into DC power while improving the power factor of AC power.

The switching power supply device may be configured using a diode bridge, an inductor, a switching element, a diode, and a smoothing capacitor as a PFC circuit, for example. A diode bridge can be configured by bridging four diodes. In this configuration, after full-wave rectifying the AC voltage with a diode bridge, energy is repeatedly accumulated and released in the inductor by the switching operation of a switching element, and accordingly, stopping and injection of the current into a smoothing capacitor via the diode are repeated. As a result, the switching power supply device can generate a DC output voltage while bringing the phase of the AC current close to the phase of the AC voltage, and can improve the power factor.

On the other hand, in a switching power supply device, an inrush current may be generated at the moment when the circuit is connected to the AC power supply at the startup when the supply of the AC power by the AC power supply starts. At startup, the voltage of the smoothing capacitor is low, so that a steep current can flow through the smoothing capacitor as a transient current, and accordingly, an inrush current can flow through the circuit. In order to prevent the inrush current, a configuration is conceivable in which a mechanical relay and a circuit in which resistance elements are connected in parallel across the relay are connected in series to a current path between the AC power supply and the smoothing capacitor. In this configuration, since a mechanical relay is used, the switching power supply device tends to be large in size, and it becomes difficult to meet the demand for the mounting space when the switching power supply device is mounted in a vehicle, for example.

In order to prevent the inrush current and suppress the increase in size of the device, a configuration is conceivable in which two of the four diodes of the diode bridge are replaced with a thyristor instead of the mechanical relay. In this configuration, control is conceivable in which the phase angle of an input voltage is calculated and the thyristor is gate-driven at a predetermined phase angle. In this case, the switching power supply device tends to complicate the control of the gate drive of the thyristor since the phase angle range to be controlled is calculated in addition to the calculation of the phase angle at startup. As a result, the control load increases, an operation delay or the like occurs, and the gate drive of the thyristor deviates from an appropriate timing, so that the control accuracy tends to deteriorate.

Therefore, in the present embodiment, the switching power supply device is controlled using the input voltage itself detected at startup, and the thyristor is selectively turned on during the period in which the absolute amplitude value thereof is smaller than a threshold value, thereby simplifying the suppression control of the inrush current.

Specifically, a switching power supply device 1 can be configured as a full-bridge-type switching power supply device as illustrated in FIG. 1. FIG. 1 is a diagram illustrating a configuration of the switching power supply device 1. The switching power supply device 1 is arranged between an AC power supply PS and a load circuit LD, converts the AC power received from the AC power supply PS into DC power, and outputs the DC power to the load circuit LD. The switching power supply device 1 has input nodes Nin1, Nin2 and output nodes Nout1 and Nout2, and the AC power supply PS may be connected to the input nodes Nin1 and Nin2, and the load circuit LD may be connected to the output nodes Nout1 and Nout2. The voltage of the input node Nin1 based on the input node Nin2 is called the input voltage Vin, and the voltage of the output node Nout1 based on the output node Nout2 is called an output voltage Vout. The input voltage Vin is an AC voltage and the output voltage Vout is a DC voltage.

At startup, the switching power supply device 1 gradually increases the output voltage Vout to a predetermined level while monitoring the input voltage Vin and the output voltage Vout. In the steady state, the switching power supply device 1 performs a switching operation by the switching element while monitoring the input voltage Vin and the output voltage Vout, and generates an output voltage Vout in a desired voltage range.

The switching power supply device 1 includes a thyristor SCR1, a thyristor SCR2, a diode D1, a diode D2, an induction element L1, a diode D3, a switching element SW1, a capacitive element C1, a voltage detection unit 2, a voltage detection unit 3, and a control circuit 10.

The thyristor SCR1, the thyristor SCR2, the diode D1 and the diode D2 are bridge-connected and can function as a diode bridge for full-wave rectifying the AC current from the AC current power supply PS.

The thyristor SCR1 is electrically connected between the input node Nin1 and the node N1. The thyristor SCR1 can function as a rectifying element that rectifies the current in the direction from the input node Nin1 to the node N1 according to the control from the control circuit 10. In the thyristor SCR1, the anode is connected to the input node Nin1, the cathode is connected to the node N1, and the gate is connected to the control circuit 10. The thyristor SCR1 is turned on when the control signal of the active level Va1 is received from the control circuit 10 at the gate to function as a rectifying element that rectifies the current from the input node Nin1 to the node N1. The thyristor SCR1 is turned off when the control signal of the non-active level Vna1 is received from the control circuit 10 at the gate to electrically disconnect the input node Nin1 from the node N1.

The control signal of the active level Va1 corresponds to a gate voltage $V_{H1}$ (for example, 5 V) that turns on the thyristor SCR1. The active level Va1 is based on the cathode potential, and is expressed by the following equation 1 assuming that the cathode potential of the thyristor SCR1 is Vk1.

$$Va1 = Vk1 + V_{H1} \qquad \text{Formula 1}$$

The control signal of the non-active level Vna1 corresponds to a gate voltage $V_{L1}$ (for example, 0 V) that turns off the thyristor SCR1. The non-active level Vna1 is based on the cathode potential, and is expressed by the following equation 2 using the cathode potential Vk1 of the thyristor SCR1.

$$Vna1 = Vk1 + V_{L1} \qquad \text{Formula 2}$$

The thyristor SCR2 is electrically connected between the input node Nin2 and the node N1. The thyristor SCR2 can function as a rectifying element that rectifies the current in the direction from the input node Nin2 to the node N1 according to the control from the control circuit 10. In the thyristor SCR2, the anode is connected to the input node Nin2, the cathode is connected to the node N1, and the gate is connected to the control circuit 10. The thyristor SCR2 is turned on when the control signal of the active level Va2 is received from the control circuit 10 at the gate to function as a rectifying element that rectifies the current from the input node Nin2 to the node N1. The thyristor SCR2 is turned off when the control signal of the non-active level Vna2 is received from the control circuit 10 at the gate to electrically disconnect the input node Nin2 from the node N1.

The control signal of the active level Va2 corresponds to a gate voltage $V_{H2}$ (for example, 5 V) that turns on the thyristor SCR2. The active level Va2 is based on the cathode potential, and is expressed by the following equation 3 assuming that the cathode potential of the thyristor SCR2 is Vk2.

$$Va2=Vk2+V_{H2} \quad \text{Formula 3}$$

The control signal of the non-active level Vna2 corresponds to a gate voltage $V_{L2}$ (for example, 0 V) that turns off the thyristor SCR2. The non-active level Vna2 is based on the cathode potential and is expressed by the following equation 4 using the cathode potential Vk2 of the thyristor SCR2.

$$Vna2=Vk2+V_{L2} \quad \text{Formula 4}$$

Since the cathodes of both the thyristor SCR1 and thyristor SCR2 are connected to the node N1, the following equation 5 holds when the potential of the node N1 is Vn1.

$$Vk1=Vk2=Vn1 \quad \text{Formula 5}$$

The diode D1 is electrically connected between the input node Nin1 and the node N2. In the diode D1, the cathode is connected to the input node Nin1 and the anode is connected to the node N2. The diode D1 functions as a rectifying element that rectifies the current in the direction from the node N2 to the input node Nin1.

The diode D2 is electrically connected between the input node Nin2 and the node N2. In the diode D2, the cathode is connected to the input node Nin2 and the anode is connected to the node N2. The diode D2 functions as a rectifying element that rectifies the current in the direction from the node N2 to the input node Nin2.

The induction element L1 is electrically connected between the node N1 and the node N3. The induction element L1 is, for example, a coil, one end of which is connected to the node N1 and the other end of which is connected to the node N3. The induction element L1 can contribute to the improvement of the power factor of the switching power supply device 1 by accumulating and releasing electromagnetic energy in a steady state.

The diode D3 is electrically connected between the node N3 and the output node Nout1. In the diode D3, the anode is connected to the node N3 and the cathode is connected to the output node Nout1 and the capacitive element C1. The diode D3 functions as a rectifying element that rectifies the current in the direction from the node N3 to the output node Nout1.

The switching element SW1 is electrically connected between the node N3 and the output node Nout2. The switching element SW1 electrically connects/disconnects the node N3 and the output node Nout2 according to the control from the control circuit 10. The switching element SW1 is, for example, an N-channel MOSFET transistor, in which the source is connected to the node N2, the drain is connected to the node N3, and the gate is connected to the control circuit 10. Hereinafter, the transistor electrodes are described as drain, gate, and source on the assumption that the switching element SW1 is an N-channel MOSFET, but when the switching element SW1 is an IGBT (insulated gate-type bipolar transistor), the drain can be read a collector and the source can be read an emitter. The switching element SW1 is turned on when the control signal of the active level Va3 is received from the control circuit 10 at the gate to electrically connect the node N3 to the output node Nout2. The switching element SW1 is turned off when the control signal of the non-active level Vna3 is received from the control circuit 10 at the gate to electrically disconnect the node N3 from the output node Nout2. The N-channel MOSFET transistor is provided with a parasitic diode, and the anode side of the parasitic diode is connected to the source and the cathode side is connected to the drain. Therefore, the current can always flow from the source to the drain regardless of whether the control signal received at the gate is an active level or a non-active level. When the switching element SW1 is an IGBT, no current flows from the node Nout2 to the node N3 because there is no parasitic diode.

The control signal of the active level Va3 corresponds to a gate voltage $V_{H3}$ (for example, 15 V) that turns on the switching element SW1. The active level Va3 is based on the source potential, and is expressed by the following equation 6 assuming that the source potential of the switching element SW1 is Vs1.

$$Va3=Vs1+V_{H3} \quad \text{Formula 6}$$

The control signal of the non-active level Vna3 corresponds to a gate voltage $V_{L3}$ (for example, 0 V) that turns off the switching element SW1. The non-active level Vna3 is based on the source potential and is expressed by the following equation 7 using the source potential Vs1 of the switching element SW1.

$$Vna3=Vs1+V_{L3} \quad \text{Formula 7}$$

Since the source of the switching element SW1 is connected to the node N2, the following equation 8 holds when the potential of the node N2 is Vn2.

$$Vs1=Vn2 \quad \text{Formula 8}$$

The capacitive element C1 is electrically connected between the output node Nout1 and the output node Nout2. The capacitive element C1 is, for example, a smoothing capacitor such as an aluminum electrolytic capacitor, a film capacitor, or a ceramic capacitor, and one end thereof is connected to the output node Nout1 and the other end is connected to the output node Nout2. The capacitive element C1 can contribute to the improvement of the power factor of the switching power supply device 1 by discharging and charging the electric charge in a steady state, and can generate an output voltage Vout.

The voltage detection unit 2 detects the input voltage Vin received via the input node Nin1 and the input node Nin2. The voltage detection unit 2 includes a detection node 2a. The detection node 2a is electrically connected between the input node Nin1 and the thyristor SCR1 and is electrically connected to the control circuit 10. The voltage detection unit 2 transmits the voltage of the detection node 2a to the control circuit 10 as the detected input voltage Vin.

The voltage detection unit 3 detects the output voltage Vout output from the output node Nout1 and the output node Nout2 to the load circuit LD. The voltage detection unit 3 includes a detection node 3a. The detection node 3a is electrically connected between the diode D3 and the output node Nout1 and is electrically connected to the control circuit 10. The voltage detection unit 3 transmits the voltage of the detection node 3a to the control circuit 10 as the detected output voltage Vout.

The control circuit 10 controls the thyristor SCR1, the thyristor SCR2, and the switching element SW1 according to the input voltage Vin detected by the voltage detection unit 2 and the output voltage Vout detected by the voltage detection unit 3.

At startup, the control circuit 10 selectively turns on the thyristor SCR1 or the thyristor SCR2 during a period in which the absolute amplitude value of the input voltage Vin is smaller than a threshold value. At this time, the control circuit 10 maintains the switching element SW1 in the off state and does not control the switching operation. Further, the connection to the load circuit LD may be disconnected by turning off a switch LDSW connected between the output node Nout1 and the load circuit LD.

For example, the control circuit 10 maintains the thyristor SCR1 in the on state while maintaining the thyristor SCR2 and the switching element SW1 in the off state in a first period. The first period is a period in which the absolute amplitude value is equal to or less than a first threshold value within the latter half of a first half-cycle of the input voltage at startup. The control circuit 10 maintains the thyristor SCR1, the thyristor SCR2, and the switching element SW1 in the off state in a third period. The third period is a period within the first half-cycle excluding the first period.

Further, the control circuit 10 maintains the thyristor SCR2 in the on state while maintaining the thyristor SCR1 and the switching element SW1 in the off state in a second period. The second period is a period in which the absolute amplitude value is equal to or less than a second threshold value within the latter half of a second half-cycle of the input voltage at startup. The second half-cycle is the half-cycle following the first half-cycle. The control circuit 10 maintains the thyristor SCR1, the thyristor SCR2, and the switching element SW1 in the off state in a fourth period. The fourth period is a period within the second half-cycle excluding the second period.

As a result, the switching power supply device 1 can gradually accumulate electric charges in the capacitive element C1 and gradually increase the output voltage Vout. Therefore, the change of the current transiently flowing through the capacitive element C1 can be moderated, and the inrush current can be suppressed.

When the output voltage Vout reaches a predetermined level $V_4$, the control circuit 10 ends the startup operation. The control circuit 10 controls the switching operation by the switching element SW1 in a state where the load circuit LD is connected (for example, a state where the switch LDSW is maintained on) in the steady state. As a result, the switching power supply device 1 can generate an output voltage Vout within a desired voltage range.

The control circuit 10 has a gate drive signal generation function 16, an insulation function 17, an insulation function 18, an insulation function 19, a gate drive function 11, a gate drive function 12, a gate drive function 13, a gate drive power supply function 14, and a gate drive power supply function 15, a capacitive element C11, and a capacitive element C12.

When the switching power supply device 1 is mounted in a vehicle, a DC voltage Vbat (for example, 12 V) held by the battery BT is converted to a DC voltage Vcont1 (for example, 5 V) for control by a DCDC converter CV1 and is supplied to the gate drive signal generation function 16 and the gate drive power supply function 14. Further, the DC voltage Vbat held by the battery BT is converted into a DC voltage Vcont2 (for example, 15 V) for control by the DCDC converter CV2 and is supplied to the gate drive power supply function 15.

The gate drive signal generation function 16 is a function of generating a gate drive signal to be supplied to the gate drive functions 11 to 13 (for example, based on the ground potential) using the DC voltage Vcont1, and can be implemented as hardware. The gate drive signal generation function 16 can be implemented in a digital signal processing circuit by software such as a microcomputer or DSP. The gate drive signal generation function 16 generates a gate drive signal $GD_{SCR1}$ and supplies the same to the gate drive function 11 via the insulation function 17. The gate drive signal $GD_{SCR1}$ is a signal that controls the timing at which the thyristor SCR1 is turned on and off. The gate drive signal generation function 16 generates a gate drive signal $GD_{SCR2}$ and supplies the same to the gate drive function 12 via the insulation function 18. The gate drive signal $GD_{SCR2}$ is a signal that controls the timing at which the thyristor SCR2 is turned on and off. The gate drive signal generation function 16 generates the gate drive signal $GD_{SW1}$ and supplies the same to the gate drive function 13 via the insulation function 19. The gate drive signal $GD_{SW1}$ is a signal that controls the timing at which the switching element SW1 is turned on and off.

The insulation function 17 electrically insulates the gate drive signal generation function 16 and the gate drive function 11, and transmits the gate drive signal $GD_{SCR1}$ generated by the gate drive signal generation function 16 to the gate drive function 11. As a result, when the signal reference is different between the gate drive signal generation function 16 and the gate drive function 11, the signal can be transmitted regardless of the difference in the reference.

The insulation function 18 electrically insulates the gate drive signal generation function 16 and the gate drive function 12, and transmits the gate drive signal $GD_{SCR2}$ generated by the gate drive signal generation function 16 to the gate drive function 12. As a result, when the signal reference is different between the gate drive signal generation function 16 and the gate drive function 12, the signal can be transmitted regardless of the difference in the reference.

The insulation function 19 electrically insulates the gate drive signal generation function 16 and the gate drive function 13, and transmits the gate drive signal $GD_{SW1}$ generated by the gate drive signal generation function 16 to the gate drive function 13. As a result, when the signal reference is different between the gate drive signal generation function 16 and the gate drive function 13, the signal can be transmitted regardless of the difference in the reference.

The insulation functions 17, 18 and 19 correspond to the gate drive functions 11, 12 and 13, respectively. Each of the insulation functions 17 to 19 may have a photocoupler, a magnetic coupler, or a capacitive coupler. When a photocoupler is provided, each of the insulation functions 17 to 19 has a light-emitting element and a light-receiving element coupled optically, causes the light-emitting element to emit light in response to a gate drive signal, causes the light-receiving element to receive the light, and transmits the same to the corresponding gate drive function. When a magnetic coupler is provided, each of the insulation functions 17 to 19 has a transmission coupler and a reception coupler coupled magnetically, causes the transmission coupler to generate a magnetic field in response to a gate drive signal, causes the reception coupler to generate an induction current in response to the magnetic field, and transmits the same to the corresponding gate drive function. When a capacitive coupler is provided, each of the insulation functions 17 to 19 has a transmitting electrode and a receiving electrode coupled capacitively, causes the transmitting electrode to generate an electric field in response to a gate drive signal, causes the receiving electrode to generate current in response to the electric field, and transmits the same to the corresponding gate drive function.

The gate drive function 11 is a function for driving the thyristor SCR1 and can be implemented as a hardware circuit. The gate drive function 11 can be implemented as an IC provided with a circuit for amplifying current, such as, for example, a push-pull circuit of a transistor. The gate drive function 11 generates a control signal $CS_{SCR1}$ and supplies the same to the gate of the thyristor SCR1 to drive the thyristor SCR1.

In the gate drive function 11, the signal input node is connected to the gate drive signal generation function 16 via the insulation function 17. The gate drive function 11 receives the gate drive signal $GD_{SCR1}$ for the thyristor SCR1 from the gate drive signal generation function 16 via the insulation function 17. In the gate drive function 11, the power input node is connected to one end of the capacitive element C11 and the gate drive power supply function 14. In the gate drive function 11, the reference input node is connected to the other end of the capacitive element C11 and the node N1. The gate drive function 11 receives the cathode potential Vk1 of the thyristor SCR1 as a reference potential.

The gate drive function 12 is a function for driving the thyristor SCR2, and can be implemented as a hardware circuit. The gate drive function 12 can be implemented as an IC provided with a circuit for amplifying current, such as, for example, a push-pull circuit of a transistor. The gate drive function 12 generates a control signal $CS_{SCR2}$ and supplies the same to the gate of the thyristor SCR2 to drive the thyristor SCR2.

In the gate drive function 12, the signal input node is connected to the gate drive signal generation function 16 via the insulation function 18. The gate drive function 12 receives the gate drive signal $GD_{SCR2}$ for the thyristor SCR2 from the gate drive signal generation function 16 via the insulation function 18. In the gate drive function 12, the power input node is connected to one end of the capacitive element C11 and the gate drive power supply function 14. In the gate drive function 12, the reference input node is connected to the other end of the capacitive element C11 and the node N1. The gate drive function 12 receives the cathode potential Vk2 of the thyristor SCR2 as a reference potential.

Here, since the cathode of the thyristor SCR1 and the cathode of the thyristor SCR2 are both connected to the node N1 and have a common reference potential, the gate drive power supply function 14 can be shared by the gate drive function 11 and the gate drive function 12.

The gate drive power supply function 14 generates a gate drive voltage $V_{SCR}$ and supplies the same to the gate drive function 11 and the gate drive function 12. The gate drive voltage $V_{SCR}$ corresponds to the gate voltages $V_{H1}$ and $V_{H2}$ that turn on the thyristor SCR1 or thyristor SCR2, and for example, $$V_{H1} \approx V_{H2} \approx V_{SCR}.$$

The gate drive power supply function 14 generates the gate drive voltage $V_{SCR}$ (for example, 5 V) using the voltage Vcont1 and accumulates the gate drive voltage $V_{SCR}$ in the capacitive element C11.

The gate drive function 11 receives the gate drive voltage $V_{SCR}$ accumulated in the capacitive element C11 at the power input node. At this time, the capacitive element C11 holds the gate drive voltage $V_{SCR}$. When the cathode potential Vk1 of the thyristor SCR1 fluctuates and the potential of the other end of the capacitive element C11 fluctuates, the potential of one end of the capacitive element C11 also fluctuates. As a result, the gate drive function 11 can receive the gate drive voltage $V_{SCR}$ of the active level Va1 which fluctuates according to the fluctuation of the cathode potential Vk1 at the power supply node.

Therefore, the gate drive function 11 can generate the control signals $CS_{SCR1}$ of the active level Va1 and the non-active level Vna1 shown in Equations 1 and 2 according to the gate drive signal $GD_{SCR1}$ and supply the same to the gate of the thyristor SCR1. That is, the control circuit 10 can control the gate voltage of the thyristor SCR1 so as to be maintained at $V_{H1}$ or $V_{L1}$ with reference to the cathode.

Similarly, the gate drive function 12 receives the gate drive voltage $V_{SCR}$ accumulated in the capacitive element C11 at the power input node. At this time, the capacitive element C11 holds the gate drive voltage $V_{SCR}$. When the cathode potential Vk2 of the thyristor SCR2 fluctuates and the potential of the other end of the capacitive element C11 fluctuates, the potential of one end of the capacitive element C11 also fluctuates. As a result, the gate drive function 12 can receive the gate drive voltage $V_{SCR}$ of the active level Va2 which fluctuates according to the fluctuation of the cathode potential Vk2 at the power supply node.

Therefore, the gate drive function 12 can generate the control signals $CS_{SCR2}$ of the active level Va2 and the non-active level Vna2 shown in Equations 3 and 4 according to the gate drive signal $GD_{SCR2}$ and supply the same to the gate of the thyristor SCR2. That is, the control circuit 10 can control the gate voltage of the thyristor SCR2 so as to be maintained at $V_{H2}$ or $V_{L2}$ with reference to the cathode.

The gate drive function 13 is a function of driving the switching element SW1 and can be implemented as a hardware circuit. The gate drive function 13 can be implemented as an IC provided with a circuit for amplifying current, such as, for example, a push-pull circuit of a transistor. The gate drive function 13 generates a control signal $CS_{SW1}$ and supplies the same to the gate of the switching element SW1 to drive the switching element SW1.

In the gate drive function 13, the signal input node is connected to the gate drive signal generation function 16 via the insulation function 19. The gate drive function 13 receives the gate drive signal $GD_{SW1}$ for the switching element SW1 from the gate drive signal generation function 16 via the insulation function 19. In the gate drive function 13, the power input node is connected to one end of the capacitive element C12 and the gate drive power supply function 14. In the gate drive function 13, the reference input node is connected to the other end of the capacitive element C12 and the node N2. The gate drive function 13 receives the source potential Vs1 of the switching element SW1 as a reference potential.

The gate drive power supply function 15 generates a gate drive voltage $V_{SW}$ and supplies the same to the gate drive function 13. The gate drive voltage $V_{SW}$ corresponds to the gate voltage $V_{H3}$ that turns on the switching element SW1, and for example, $$V_{H3} \approx V_{SW}.$$

The gate drive power supply function 15 generates the gate drive voltage $V_{SW}$ (for example, 15 V) using the voltage Vcont2, and accumulates the gate drive voltage $V_{SW}$ in the capacitive element C12.

The gate drive function 13 receives the gate drive voltage $V_{SW}$ accumulated in the capacitive element C12 at the power input node. At this time, the capacitive element C12 holds the gate drive voltage $V_{SW}$. When the source potential Vs1 of the switching element SW1 fluctuates and the potential of the other end of the capacitive element C12 fluctuates, the potential of one end of the capacitive element C12 also fluctuates. As a result, the gate drive function 13 can receive the gate drive voltage $V_{SW}$ of the active level Va3 which fluctuates according to the fluctuation of the source potential Vs1 at the power supply node. Therefore, the gate drive function 13 can generate the control signals $CS_{SW1}$ of the active level Va3 and the non-active level Vna3 shown in Equations 6 and 7 according to the gate drive signal $GD_{SW1}$ and supply the same to the gate of the switching element SW1. That is, the control circuit 10 can control the gate voltage of the switching element SW1 so as to be maintained at $V_{H3}$ or $V_{L3}$ with reference to the source.

The gate drive power supply functions 14 and 15 may be mounted in a circuit in which an element such as a transformer that generates a voltage and a power supply IC that stabilizes the output voltage using the element as a voltage source are combined in series.

The insulation functions 17 to 19 and the gate drive functions 11 to 13 may be implemented as an IC in which the corresponding sets are integrated. Alternatively, the insulation functions 17 to 19, the gate drive functions 11 to 13, and the gate drive power supply functions 14 and 15 may be mounted using a pulse transformer that transmits high-frequency pulses as a component in which the corresponding sets are integrated.

Next, the operation of the switching power supply device 1 will be described with reference to FIGS. 2 to 4D. FIG. 2 is a waveform diagram illustrating the operations of the switching power supply device 1 at startup and steady state. FIGS. 3A to 3D are diagrams illustrating the startup operation of the switching power supply device 1. FIGS. 4A to 4D are diagrams illustrating the steady-state operation of the switching power supply device 1.

At the timing t1, the supply of the input voltage Vin to the input nodes Nin1 and Nin2 is started. The input voltage Vin is an AC voltage and changes in a sinusoidal shape around a reference potential (for example, 0 V). If the amplitude higher than the reference potential is called a positive amplitude and the amplitude lower than the reference potential is called a negative amplitude, the input voltage Vin becomes the positive amplitude at the odd-numbered half-cycles $T_1$, $T_3$, $T_5$, and $T_7$ counting from the timing t1, and becomes the negative amplitude at the even-numbered half-cycles $T_2$, $T_4$, $T_6$, and $T_8$.

In the period $T_{11}$ of the timings t1 to t2, the control circuit 10 maintains the gate voltages of the thyristor SCR1, the thyristor SCR2, and the switching element SW1 at $V_{L1}$, $V_{L2}$, and $V_{L3}$, respectively, in response to the tendency of the absolute amplitude value of the input voltage Vin to increase. The control circuit 10 compares the absolute amplitude value of the input voltage Vin with the threshold value Vth1 when the absolute amplitude value of the input voltage Vin tends to decrease. The control circuit 10 maintains the gate voltages of the thyristor SCR1, the thyristor SCR2, and the switching element SW1 at $V_{L1}$, $V_{L2}$, and $V_{L3}$, respectively, in response to the absolute amplitude value of the input voltage Vin being larger than the threshold value Vth1. As a result, in the period $T_{11}$, as illustrated in FIG. 3A, the thyristor SCR1, the thyristor SCR2, and the switching element SW1 are each maintained in the off state, no current flows from the AC power supply PS, and the output voltage Vout generated by the capacitive element C1 is maintained at the initial value V0 ($\approx$0 V).

At the timing t2, the control circuit 10 maintains the gate voltages of the thyristor SCR2 and the switching element SW1 at $V_{L2}$ and $V_{L3}$, respectively, in response to the absolute amplitude value of the input voltage Vin reaching the threshold value Vth1, and changes the gate voltage of $V_{L1}$ of the thyristor SCR1 to $V_{H1}$. In the period $T_{12}$ of the timings t2 to t3, the control circuit 10 maintains the gate voltages of the thyristor SCR2 and the switching element SW1 at $V_{L2}$ and $V_{L3}$, respectively, in response to the absolute amplitude value of the input voltage Vin being equal to or less than the threshold value Vth1, and maintains the gate voltage of the thyristor SCR1 at $V_{H1}$. As a result, in the period $T_{12}$, as illustrated in FIG. 3B, current flows in the path of AC power supply PS→thyristor SCR1→induction element L1→diode D3→capacitive element C1→diode D2→AC power supply PS, electric charges are accumulated in the capacitive element C1, and the output voltage Vout generated by the capacitive element C1 rises from V0 to V1.

The period $T_{12}$ is a period in which the absolute amplitude value of the input voltage Vin is equal to or less than the threshold value Vth1 within the latter half of the half-cycle $T_1$. The period $T_{11}$ is the period within the half-cycle $T_1$ excluding the period $T_{12}$.

In the period $T_{21}$ of the timings t3 to t4, the control circuit 10 maintains the gate voltages of the thyristor SCR1, the thyristor SCR2, and the switching element SW1 at $V_{L1}$, $V_{L2}$, and $V_{L3}$, respectively, in response to the tendency of the absolute amplitude value of the input voltage Vin to increase. The control circuit 10 compares the absolute amplitude value of the input voltage Vin with the threshold value Vth2 when the absolute amplitude value of the input voltage Vin tends to decrease. The control circuit 10 maintains the gate voltages of the thyristor SCR1, the thyristor SCR2, and the switching element SW1 at $V_{L1}$, $V_{L2}$, and $V_{L3}$, respectively, in response to the absolute amplitude value of the input voltage Vin being larger than the threshold value Vth2. As a result, in the period $T_{21}$, as illustrated in FIG. 3C, the thyristor SCR1, the thyristor SCR2, and the switching element SW1 are each maintained in the off state, no current flows from the AC power supply PS, and the output voltage Vout generated by the capacitive element C1 is maintained at V1.

At the timing t4, the control circuit 10 maintains the gate voltages of the thyristor SCR1 and the switching element SW1 at $V_{L1}$ and $V_{L3}$, respectively, in response to the absolute amplitude value of the input voltage Vin reaching the threshold value Vth2, and changes the gate voltage of the thyristor SCR2 from $V_{L2}$ to $V_{H2}$. In the period $T_{22}$ of the timings t4 to t5, the control circuit 10 maintains the gate voltages of the thyristor SCR1 and the switching element SW1 at $V_{L1}$ and $V_{L3}$, respectively, in response to the absolute amplitude value of the input voltage Vin being equal to or less than the threshold value Vth2, and maintains the gate voltage of the thyristor SCR2 at $V_{H2}$. As a result, in the period $T_{22}$, as illustrated in FIG. 3D, current flows in the path of AC power supply PS→thyristor SCR2→induction element L1→diode D3→capacitive element C1→diode D1→AC power supply PS, electric charges are accumulated in the capacitive element C1, and the output voltage Vout generated by the capacitive element C1 rises from V1 to V2.

The period $T_{22}$ is a period in which the absolute amplitude value of the input voltage Vin is equal to or less than the threshold value Vth2 within the latter half of the half-cycle $T_2$. The threshold value Vth2 is larger than the threshold value Vth1. Therefore, the length of the period $T_{22}$ is longer than the length of the period $T_{12}$. The period $T_{21}$ is the period excluding the period $T_{22}$ in the half-cycle $T_2$.

In the period $T_{31}$ of the timings t5 to t6, the control circuit 10 maintains the gate voltages of the thyristor SCR1, the thyristor SCR2, and the switching element SW1 at $V_{L1}$, $V_{L2}$, and $V_{L3}$, respectively, in response to the tendency of the absolute amplitude value of the input voltage Vin to increase. When the absolute amplitude value of the input voltage Vin tends to decrease, the control circuit 10 compares the absolute amplitude value of the input voltage Vin with the threshold value Vth3. The control circuit 10 maintains the gate voltages of the thyristor SCR1, the thyristor SCR2, and the switching element SW1 at $V_{L1}$, $V_{L2}$, and $V_{L3}$, respectively, in response to the absolute amplitude value of the input voltage Vin being larger than the threshold value Vth3. As a result, in the period $T_{31}$, as illustrated in FIG. 3A, the thyristor SCR1, the thyristor SCR2, and the switching element SW1 are each maintained in the off state, no current flows from the AC power supply PS, and the output voltage Vout generated by the capacitive element C1 is maintained at V2.

At the timing t6, the control circuit 10 maintains the gate voltages of the thyristor SCR2 and the switching element SW1 at $V_{L2}$ and $V_{L3}$, respectively, in response to the absolute amplitude value of the input voltage Vin reaching the threshold value Vth3, and changes the gate voltage of the thyristor SCR1 from $V_{L1}$ to $V_{H1}$. In the period $T_{32}$ of the timings t6 to t7, the control circuit 10 maintains the gate voltages of the thyristor SCR2 and the switching element SW1 at $V_{L2}$ and $V_{L3}$, respectively, in response to the absolute amplitude value of the input voltage Vin being equal to or less than the threshold value Vth3, and maintains the gate voltage of the thyristor SCR1 at $V_{H1}$. As a result, in the period $T_{32}$, as illustrated in FIG. 3B, current flows in the path of AC power supply PS→thyristor SCR1→induction element L1→diode D3→capacitive element C1→diode D2→AC power supply PS, electric charges are accumulated in the capacitive element C1, and the output voltage Vout generated by the capacitive element C1 rises from V2 to V3.

The period $T_{32}$ is a period in which the absolute amplitude value of the input voltage Vin is equal to or less than the threshold value Vth3 within the latter half of the half-cycle $T_3$. The threshold value Vth3 is larger than the threshold value Vth2. Therefore, the length of the period $T_{32}$ is longer than the length of the period $T_{22}$. The period $T_{31}$ is the period within the half-cycle $T_3$ excluding the period $T_{32}$.

In the period $T_{41}$ of the timings t7 to t8, the control circuit 10 maintains the gate voltages of the thyristor SCR1, the thyristor SCR2, and the switching element SW1 at $V_{L1}$, $V_{L2}$, and $V_{L3}$, respectively, in response to the tendency of the absolute amplitude value of the input voltage Vin to increase. When the absolute amplitude value of the input voltage Vin tends to decrease, the control circuit 10 compares the absolute amplitude value of the input voltage Vin with the threshold value Vth4. The control circuit 10 maintains the gate voltages of the thyristor SCR1, the thyristor SCR2, and the switching element SW1 at $V_{L1}$, $V_{L2}$, and $V_{L3}$, respectively, in response to the absolute amplitude value of the input voltage Vin being larger than the threshold value Vth4. As a result, in the period $T_{41}$, as illustrated in FIG. 3C, the thyristor SCR1, the thyristor SCR2, and the switching element SW1 are each maintained in the off state, no current flows from the AC power supply PS, and the output voltage Vout generated by the capacitive element C1 is maintained at V3.

At the timing t8, the control circuit 10 maintains the gate voltages of the thyristor SCR1 and the switching element SW1 at $V_{L1}$ and $V_{L3}$, respectively, in response to the absolute amplitude value of the input voltage Vin reaching the threshold value Vth4, and changes the gate voltage of the thyristor SCR2 from $V_{L2}$ to $V_{H2}$. In the period $T_{42}$ of timings t8 to t9, the control circuit 10 maintains the gate voltages of the thyristor SCR1 and the switching element SW1 at $V_{L1}$ and $V_{L3}$, respectively, in response to the absolute amplitude value of the input voltage Vin being equal to or less than the threshold value Vth4, and maintains the gate voltage of the thyristor SCR2 at $V_{H2}$. As a result, in the period $T_{42}$, as illustrated in FIG. 3D, current flows in the path of AC power supply PS→thyristor SCR2→induction element L1→diode D3→capacitive element C1→diode D1→AC power supply PS, electric charges are accumulated in the capacitive element C1, and the output voltage Vout generated by the capacitive element C1 rises from V3 to V4.

The period $T_{42}$ is a period in which the absolute amplitude value of the input voltage Vin is equal to or less than the threshold value Vth4 within the latter half of the half-cycle $T_4$. The threshold value Vth4 is larger than the threshold value Vth3. Therefore, the length of the period $T_{42}$ is longer than the length of the period $T_{32}$. The period $T_{41}$ is the period within the half-cycle $T_4$ excluding the period $T_{42}$.

At the timing t9, the control circuit 10 ends the startup operation and switches to the steady-state operation when the output voltage Vout reaches the desired voltage V4. In the first embodiment, an example in which the output voltage Vout reaches the desired voltage V4 when the half-cycle occurs four times is described, but the number of half-cycles is not limited to this. This operation may be repeated until the output voltage Vout reaches the desired voltage V4.

Figure 4D:
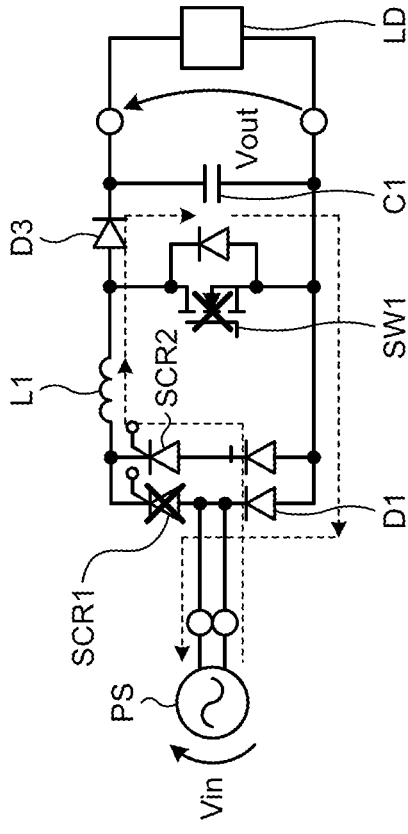
Figure 4A:
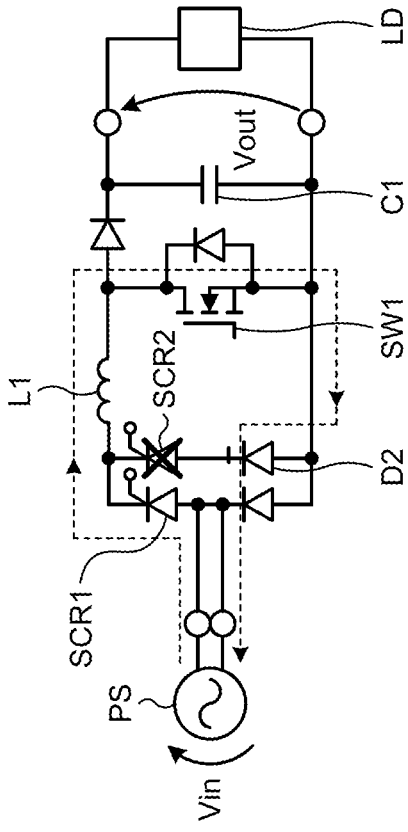
Figure 4B:
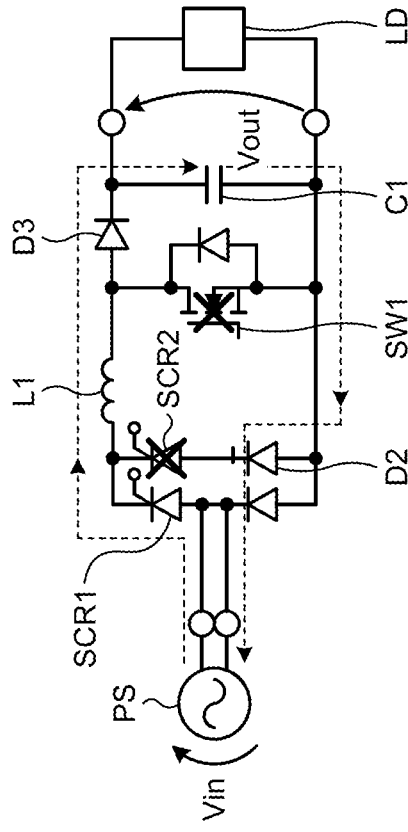

In the period of the timings t9 to t10, the control circuit 10 maintains the gate voltages of the thyristor SCR1 and the thyristor SCR2 at $V_{H1}$ and $V_{L2}$, respectively, when the timing is within the odd-numbered half-cycle $T_5$. Further, the control circuit 10 alternately switches the gate voltage of the switching element SW1 between $V_{H3}$ and $V_{L3}$. As a result, the thyristor SCR2 is maintained in the off state, and the operations of FIGS. 4A and 4B are alternately repeated. That is, as illustrated in FIG. 4A, current flows in the path of AC power supply PS thyristor SCR1→induction element L1→switching element SW1→diode D2→AC power supply PS, and electromagnetic energy is accumulated in the induction element L1. Subsequently, as illustrated in FIG. 4B, current flows in the path of AC power supply PS→thyristor SCR1→induction element L1→diode D3→capacitive element C1→diode D2→AC power supply PS, current is injected into the capacitive element C1, and the output voltage Vout approaches a predetermined value. Since the load circuit LD is connected, the current is supplied from the capacitive element C1 to the load LD regardless of whether the switching element SW1 is turned on or off, so that the output voltage Vout always gradually decreases. Therefore, in detail, an operation in which the voltage Vout of the capacitive element C1 gradually decreases during the period in which the switching element SW1 is turned on, and rapidly increases during the period in which the switching element SW1 is turned off is repeated.

At timings t10 to t11, the control circuit 10 maintains the gate voltages of the thyristor SCR1 and the thyristor SCR2 at $V_{L1}$ and $V_{H2}$, respectively, when the timing is within the even-numbered half-cycle $T_6$. Further, the control circuit 10 alternately switches the gate voltage of the switching element SW1 between $V_{H3}$ and $V_{L3}$. As a result, the thyristor SCR1 is maintained in the off state, and the operations of FIGS. 4C and 4D are alternately repeated. That is, as illustrated in FIG. 4C, current flows in the path of AC power supply PS→thyristor SCR2→induction element L1→switching element SW1→diode D1→AC power supply PS, and electromagnetic energy is accumulated in the induction element L1. Subsequently, as illustrated in FIG. 4D, current flows in the path of AC power supply PS→thyristor SCR2 induction element L1→diode D3→capacitive element C1→diode D1→AC power supply PS, current is injected into the capacitive element C1, and the output voltage Vout approaches a predetermined value. Since the load circuit LD is connected, the current is supplied from the capacitive element C1 to the load LD regardless of whether the switching element SW1 is turned on or off, so that the output voltage Vout always gradually decreases. Therefore, in detail, an operation in which the voltage Vout of the capacitive element C1 gradually decreases during the period in which the switching element SW1 is turned on, and rapidly increases during the period in which the switching element SW1 is turned off is repeated.

Subsequently, the operation in the odd-numbered half-cycle $T_7$ is the same as the operation in the half-cycle $T_5$ in the period of timings t11 to t12, and the operation in the even-numbered half-cycle $T_8$ is the same as the operation in the half-cycle $T_6$ in the period of timings t12 to t13.

As described above, in the first embodiment, the switching power supply device 1 performs control using the input voltage Vin itself detected at startup, and selectively turns on the thyristor SCR1 or SCR2 during a period in which the absolute amplitude value is smaller than the threshold value. As a result, the control for suppressing the inrush current at startup can be simplified as compared with the case of performing complicated control such as calculating the phase angle of the input voltage.

Further, in the first embodiment, since the control for suppressing the inrush current at startup can be simplified as compared with the case of performing complicated control such as calculating the phase angle of the input voltage, the configuration of the control circuit 10 for performing the control can be simplified.

Figure 5:
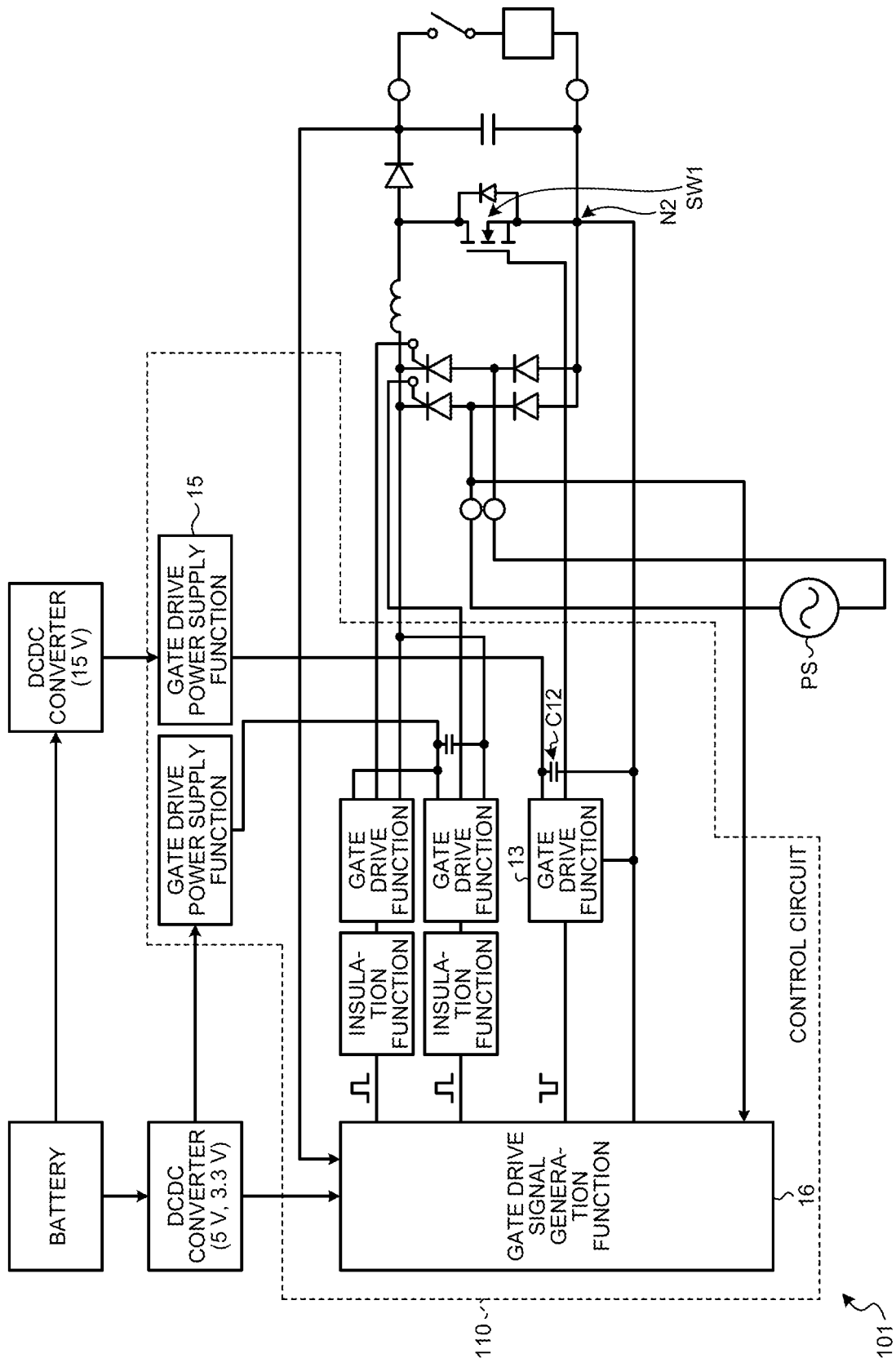
FIG. 5 is a diagram illustrating a configuration of a switching power supply device according to a first modification of the first embodiment.

As a first modification of the first embodiment, a switching power supply device 101 may have a configuration in which the insulation function 19 (see FIG. 1) is omitted, as illustrated in FIG. 5. FIG. 5 is a diagram illustrating a configuration of the switching power supply device 101 according to the first modification of the first embodiment. For example, in the configuration illustrated in FIG. 1, a line for electrically connecting the node N2 to the gate drive function 12 and the gate drive signal generation function 16 is added, and the other end of the capacitive element C12 is connected to the line. As a result, the gate drive signal generation function 16 can generate the gate drive signal $GD_{SW1}$ based on the source of the switching element SW1, and can align the signal reference of the gate drive signal generation function 16 and the gate drive function 12. Therefore, as illustrated in FIG. 5, the gate drive function 12 can be electrically connected to the gate drive signal generation function 16, and the gate drive signal $GD_{SW1}$ can be directly supplied from the gate drive signal generation function 16 to the gate drive function 12. That is, since the insulation function 19 (see FIG. 1) can be omitted, the configuration of a control circuit 110 can be further simplified.

Figure 6:
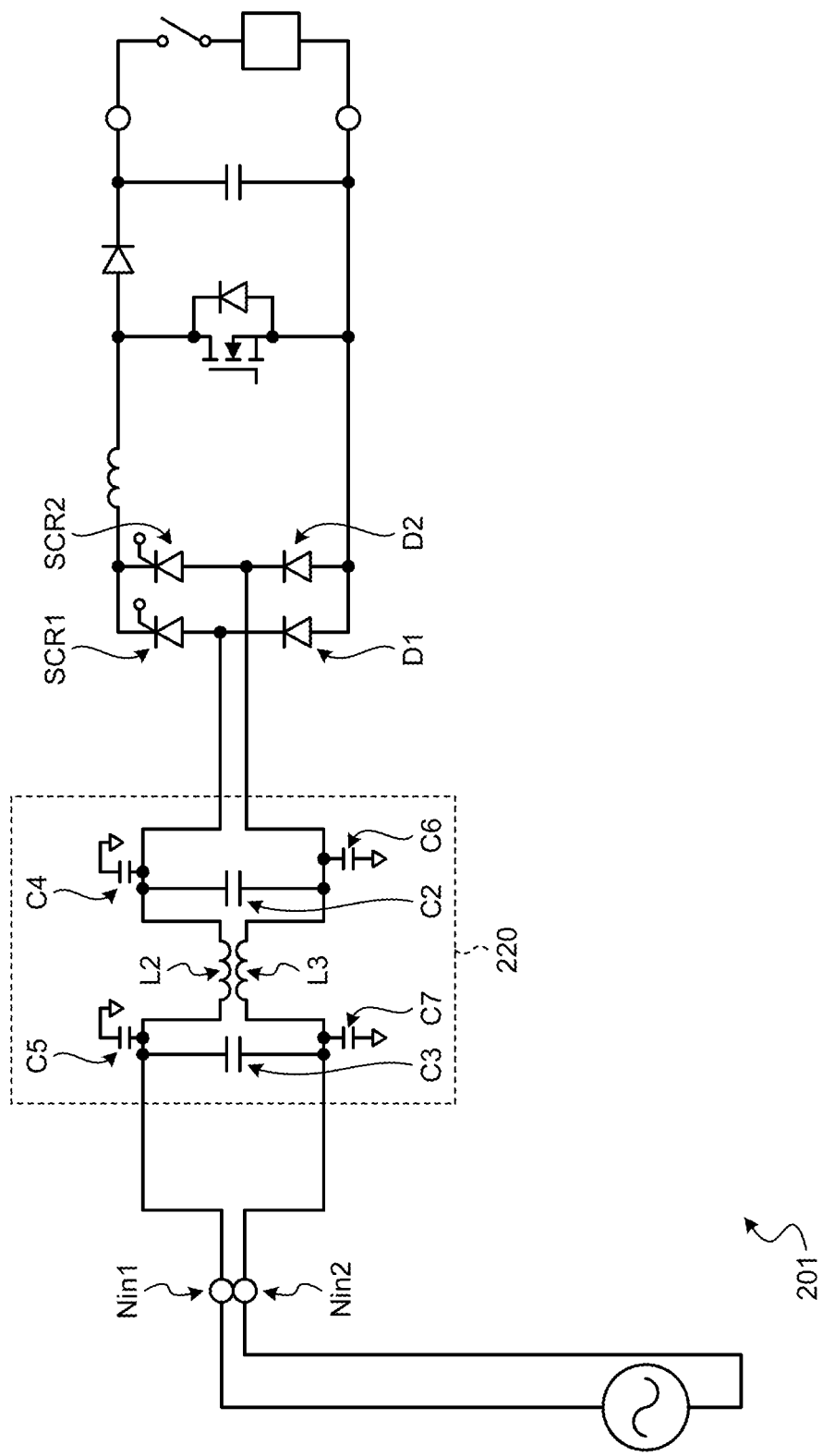
FIG. 6 is a diagram illustrating a configuration of a switching power supply device according to a second modification of the first embodiment.

Further, as a second modification of the first embodiment, a switching power supply device 201 may further include a noise filter 220 as illustrated in FIG. 6. FIG. 6 is a diagram illustrating the configuration of the switching power supply device 201 according to the second modification of the first embodiment, and the illustration of the control circuit is omitted for simplification. For example, the noise filter 220 is electrically connected between the input node Nin1 and the input node Nin2, and the thyristor SCR1, the thyristor SCR2, the diode D1 and the diode D2. The noise filter 220 includes common mode coils L2 and L3, line-to-line capacitors C2 and C3, and line-to-ground capacitors C4, C5, C6, and C7.

One set of ends of the common mode coils L2 and L3 are connected to the input nodes Nin1 and Nin2, respectively, and the other set of ends are connected to the nodes between the thyristors SCR1 and SCR2 and the diodes D1 and D2, respectively. The common mode coils L2 and L3 are configured to be wound in phase with each other on the core, and cancel the magnetic fluxes of the current flowing through the coils and attenuate the common mode noise.

One set of ends of the line-to-line capacitors C2 and C3 are connected to the line connecting the input node Nin1 and the thyristor SCR1, and the other set of ends are connected to the line connecting the input node Nin2 and the thyristor SCR2. The line-to-line capacitors C2 and C3 can bypass noise between lines and attenuate normal mode noise.

One set of ends of the line-to-ground capacitors C4 and C5 are connected to the line connecting the input node Nin1 and the thyristor SCR1, and the other set of ends are connected to the ground potential. The line-to-ground capacitors C4 and C5 can bypass noise to the ground potential and attenuate common mode noise.

One set of ends of the line-to-ground capacitors C6 and C7 are connected to the line connecting the input node Nin2 and the thyristor SCR2, and the other set of ends are connected to the ground potential. The line-to-ground capacitors C6 and C7 can bypass noise to the ground potential and attenuate common mode noise.

As described above, the switching power supply device 201 can further suppress the radiation of noise to the outside and can reduce the influence of the noise from the outside since it further includes the noise filter 220.

Second Embodiment

Next, the switching power supply device according to the second embodiment will be described. In the following, the parts different from the first embodiment will be mainly described.

In the first embodiment, a full-bridge-type switching power supply device is illustrated, but in the second embodiment, a bridgeless-type switching power supply device having no diode bridge is illustrated.

Figure 7:
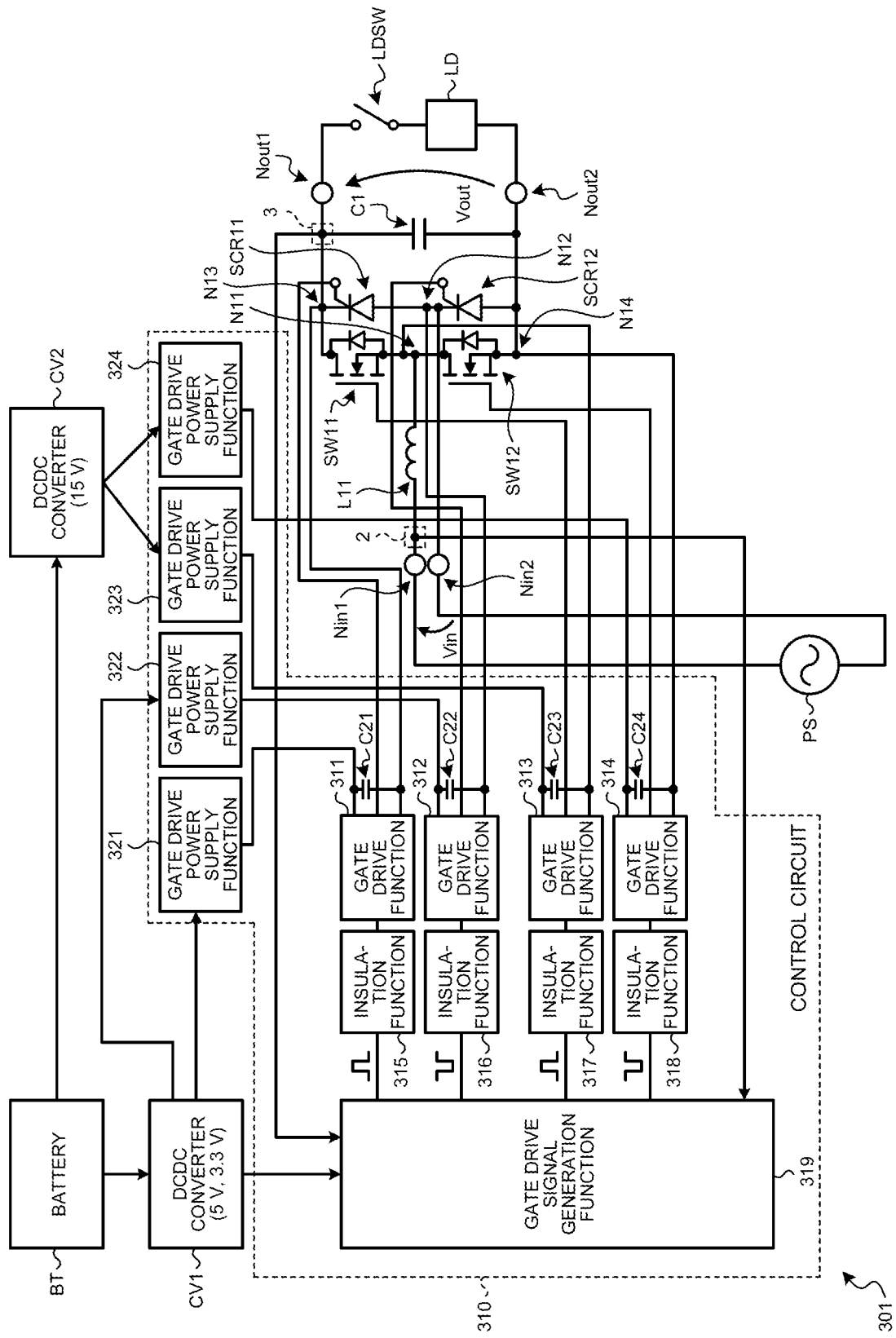
FIG. 7 is a diagram illustrating a configuration of a switching power supply device according to a second embodiment.

Specifically, in a switching power supply device 301, as illustrated in FIG. 7, the diodes D1 and D2 are omitted, and an induction element L11, thyristors SCR11 and SCR12, switching elements SW11 and SW12, and a control circuit 310 are provided instead of the induction element L1, the thyristors SCR1 and SCR2, the switching element SW1, and the control circuit 10 (see FIG. 1).

The induction element L11 is electrically connected between the input node Nin1 and the node N11. The induction element L11 is, for example, a coil, one end of which is connected to the input node Nin1 and the other end of which is connected to the node N11.

The thyristor SCR11 is electrically connected between the input node Nin2 and the output node Nout1. In the thyristor SCR11, the cathode is connected to the output node Nout1 via the node N13, the anode is connected to the input node Nin2, and the gate is connected to the control circuit 10. The thyristor SCR11 is turned on when the control signal of the active level Va11 is received from the control circuit 10 at the gate, and is turned off when the control signal of the non-active level Vna11 is received at the gate.

The control signal of the active level Va11 corresponds to a gate voltage $V_{H11}$ (for example, 5 V) that turns on the thyristor SCR11. The active level Va11 is based on the cathode potential, and is expressed by the following equation 9 assuming that the cathode potential of the thyristor SCR11 is Vk11.

$$Va11=Vk11+V_{H11} \quad \text{Formula 9}$$

The control signal of the non-active level Vna11 corresponds to a gate voltage $V_{L11}$ (for example, 0 V) that turns off the thyristor SCR11. The non-active level Vna11 is based on the cathode potential and is expressed by the following equation 10 using the cathode potential Vk11 of the thyristor SCR11.

$$Vna11=Vk11+V_{L11} \quad \text{Formula 10}$$

The thyristor SCR12 is electrically connected between the input node Nin2 and the output node Nout2. In the thyristor SCR12, the cathode is connected to the input node Nin2, the anode is connected to the output node Nout2, and the gate is connected to the control circuit 10. The thyristor SCR12 is turned on when the control signal of the active level Va12 is received from the control circuit 10 at the gate, and is turned off when the control signal of the non-active level Vna12 is received at the gate.

The control signal of the active level Va12 corresponds to a gate voltage $V_{H12}$ (for example, 5 V) that turns on the thyristor SCR12. The active level Va12 is based on the cathode potential, and is expressed by the following equation 11 assuming that the cathode potential of the thyristor SCR12 is Vk12.

$$Va12=Vk12+V_{H12} \quad \text{Formula 11}$$

The control signal of the non-active level Vna12 corresponds to a gate voltage $V_{L12}$ (for example, 0 V) that turns off the thyristor SCR12. The non-active level Vna12 is based on the cathode potential and is expressed by the following equation 12 using the cathode potential Vk12 of the thyristor SCR12.

$$Vna12=Vk12+V_{L12} \quad \text{Formula 12}$$

The switching element SW11 is electrically connected between the node N11 and the output node Nout1. The switching element SW11 is, for example, an N-channel MOSFET transistor, in which the source is connected to the node N11, the drain is connected to the output node Nout1, and the gate is connected to the control circuit 10. The switching element SW11 is turned on when the control signal of the active level Va13 is received from the control circuit 10 at the gate, and is turned off when the control signal of the non-active level Vna13 is received at the gate.

The control signal of the active level Va13 corresponds to a gate voltage $V_{H13}$ (for example, 15 V) that turns on the switching element SW11. The active level Va13 is based on the source potential, and is expressed by the following equation 13 assuming that the source potential of the switching element SW11 is Vs11.

$$Va13=Vs11+V_{H13} \quad \text{Formula 13}$$

The control signal of the non-active level Vna13 corresponds to a gate voltage $V_{L13}$ (for example, 0 V) that turns off the switching element SW11. The non-active level Vna13 is based on the source potential and is expressed by the following equation 14 using the source potential Vs11 of the switching element SW11.

$$Vna13=Vs11+V_{L13} \quad \text{Formula 14}$$

The switching element SW12 is electrically connected between the node N11 and the output node Nout2. The switching element SW12 is, for example, an N-channel MOSFET transistor, in which the source is connected to the output node Nout2 via the node N14, the drain is connected to the node N11, and the gate is connected to the control circuit 10. The switching element SW12 is turned on when the control signal of the active level Va14 is received from the control circuit 10 at the gate, and is turned off when the control signal of the non-active level Vna14 is received at the gate.

The control signal of the active level Va14 corresponds to a gate voltage $V_{H14}$ (for example, 15 V) that turns on the switching element SW12. The active level Va14 is based on the source potential, and is expressed by the following equation 15 assuming that the source potential of the switching element SW12 is Vs12.

$$Va14=Vs12+V_{H14} \quad \text{Formula 15}$$

The control signal of the non-active level Vna14 corresponds to a gate voltage $V_{L14}$ (for example, 0 V) that turns off the switching element SW12. The non-active level Vna14 is based on the source potential and is expressed by the following equation 16 using the source potential Vs12 of the switching element SW12.

$$Vna14=Vs12+V_{L14} \quad \text{Formula 16}$$

The control circuit 310 controls the thyristor SCR11, the thyristor SCR12, the switching element SW11, and the switching element SW12 according to the input voltage Vin detected by the voltage detection unit 2 and the output voltage Vout detected by the voltage detection unit 3. At startup, the control circuit 310 selectively turns on the thyristor SCR11 or the thyristor SCR12 during a period in which the absolute amplitude of the input voltage Vin is smaller than the threshold value. For example, the control circuit 310 maintains the thyristor SCR12 and the switching element SW11 in the on state while maintaining the thyristor SCR11 and the switching element SW12 in the off state in a first period. The first period is a period in which the absolute amplitude value is equal to or less than the first threshold value within the latter half of a first half-cycle of the input voltage Vin at startup. The control circuit 310 maintains the thyristor SCR11, the thyristor SCR12, the switching element SW11, and the switching element SW12 in the off state in a third period. The third period is a period within the first half-cycle excluding the first period. The control circuit 310 maintains the thyristor SCR11 and the switching element SW12 in the on state while maintaining the thyristor SCR12 and the switching element SW11 in the off state in a second period. The second period is a period in which the absolute amplitude value is equal to or less than the second threshold value within the latter half of the second half-cycle following the first half-cycle of the input voltage Vin at startup. The control circuit 310 maintains the thyristor SCR11, the thyristor SCR12, the switching element SW12, and the switching element SW11 in the off state in a fourth period. The fourth period is a period within the second half-cycle excluding the second period.

As illustrated in FIG. 7, the references of the control signals of the thyristor SCR11, the thyristor SCR12, the switching element SW11, and the switching element SW12 are the potential of the node N13, the potential of the node N12, the potential of the node N11, and the potential of the node N14, respectively, which are different from each other. Therefore, the control circuit 310 is configured to separately generate control signals for the thyristor SCR11, the thyristor SCR12, the switching element SW11, and the switching element SW12. For example, the control circuit 310 has a gate drive signal generation function 319, insulation functions 315, 316, 317, and 318, gate drive functions 311, 312, 313, and 314, gate drive power supply functions 321, 322, 323, and 324, and capacitive elements C21, C22, C23, and C24.

When the switching power supply device 1 is mounted in a vehicle, a DC voltage Vbat (for example, 12 V) held by the battery BT is converted to a DC voltage Vcont1 (for example, 5 V) for control by the DCDC converter CV1 and is supplied to the gate drive signal generation function 319 and the gate drive power supply functions 321 and 322. Further, the DC voltage Vbat held by the battery BT is converted into a DC voltage Vcont2 (for example, 15 V) for control by the DCDC converter CV2 and is supplied to the gate drive power supply functions 323 and 324.

The gate drive signal generation function 319 generates a gate drive signal $GD_{SCR11}$ and supplies the same to the gate drive function 311 via the insulation function 315. The gate drive signal generation function 319 generates a gate drive signal $GD_{SCR12}$ and supplies the same to the gate drive function 312 via the insulation function 316. The gate drive signal generation function 319 generates a gate drive signal $GD_{SW11}$ and supplies the same to the gate drive function 313 via the insulation function 317. The gate drive signal generation function 319 generates a gate drive signal $GD_{SW12}$ and supplies the same to the gate drive function 314 via the insulation function 318.

The insulation function 315 electrically insulates the gate drive signal generation function 319 and the gate drive function 311, and transmits the gate drive signal $GD_{SCR11}$ generated by the gate drive signal generation function 319 to the gate drive function 311.

The insulation function 316 electrically insulates the gate drive signal generation function 319 and the gate drive function 312, and transmits the gate drive signal $GD_{SCR12}$ generated by the gate drive signal generation function 319 to the gate drive function 312.

The insulation function 317 electrically insulates the gate drive signal generation function 319 and the gate drive function 313, and transmits the gate drive signal $GD_{SW11}$ generated by the gate drive signal generation function 319 to the gate drive function 313.

The insulation function 318 electrically insulates the gate drive signal generation function 319 and the gate drive function 314, and transmits the gate drive signal $GD_{SW12}$ generated by the gate drive signal generation function 319 to the gate drive function 314.

The gate drive function 311 is a function for driving the thyristor SCR11. In the gate drive function 311, the signal input node is connected to the gate drive signal generation function 319 via the insulation function 315, the power input node is connected to one end of the capacitive element C21 and the gate drive power supply function 321, and the reference input node is connected to the other end of the capacitive element C21 and the node N13.

The gate drive function 312 is a function for driving the thyristor SCR12. In the gate drive function 312, the signal input node is connected to the gate drive signal generation function 319 via the insulation function 316, the power input node is connected to one end of the capacitive element C22 and the gate drive power supply function 322, and the reference input node is connected to the other end of the capacitive element C22 and the node N12.

The gate drive function 313 is a function for driving the switching element SW11. In the gate drive function 313, the signal input node is connected to the gate drive signal generation function 319 via the insulation function 317, the power input node is connected to one end of the capacitive element C23 and the gate drive power supply function 323, and the reference input node is connected to the other end of the capacitive element C23 and the node N11.

The gate drive function 314 is a function for driving the switching element SW12. In the gate drive function 314, the signal input node is connected to the gate drive signal generation function 319 via the insulation function 318, the power input node is connected to one end of the capacitive element C24 and the gate drive power supply function 324, and the reference input node is connected to the other end of the capacitive element C24 and the node N14.

The gate drive power supply function 321 generates the gate drive voltage $V_{SCR11}$ and supplies the same to the gate drive function 311. The gate drive voltage $V_{SCR11}$ corresponds to a gate voltage $V_{H11}$ that turns on the thyristor SCR11, and for example, $$V_{H11} \approx V_{SCR11}.$$

The gate drive power supply function 321 generates a gate drive voltage $V_{SCR11}$ (for example, 5 V) using the voltage Vcont1, and accumulates the gate drive voltage $V_{SCR11}$ in the capacitive element C21.

The gate drive function 311 receives the gate drive voltage $V_{SCR11}$ accumulated in the capacitive element C21 at the power input node. The gate drive function 311 can generate the control signals $CS_{SCR11}$ of the active level Va11 and the non-active level Vna11 shown in Equations 9 and 10 according to the gate drive signal $GD_{SCR11}$ and supply the same to the gate of the thyristor SCR11. That is, the control circuit 310 can control the gate voltage of the thyristor SCR11 so as to be maintained at $V_{H11}$ or $V_{L11}$ with reference to the cathode.

The gate drive power supply function 322 generates the gate drive voltage $V_{SCR12}$ and supplies the same to the gate drive function 312. The gate drive voltage $V_{SCR12}$ corresponds to the gate voltage $V_{H12}$ that turns on the thyristor SCR12, and for example $$V_{H12} \approx V_{SCR12}.$$

The gate drive power supply function 322 generates the gate drive voltage $V_{SCR12}$ (for example, 5 V) using the voltage Vcont1 and accumulates the gate drive voltage $V_{SCR12}$ in the capacitive element C22.

The gate drive function 312 receives the gate drive voltage $V_{SCR12}$ accumulated in the capacitive element C22 at the power input node. The gate drive function 312 can generate the control signals $CS_{SCR12}$ of the active level Va12 and the non-active level Vna12 shown in Equations 11 and 12 according to the gate drive signal $GD_{SCR12}$ and supply the same to the gate of the thyristor SCR12. That is, the control circuit 310 can control the gate voltage of the thyristor SCR12 so as to be maintained at $V_{H12}$ or $V_{L12}$ with reference to the cathode. The gate drive power supply function 323 generates the gate drive voltage $V_{SW11}$ and supplies the same to the gate drive function 313. The gate drive voltage $V_{SW11}$ corresponds to the gate voltage $V_{H13}$ that turns on the switching element SW11, and for example, $$V_{H13} \approx V_{SW11}.$$

The gate drive power supply function 323 generates the gate drive voltage $V_{SW11}$ (for example, 15 V) using the voltage Vcont2, and accumulates the gate drive voltage $V_{SW11}$ in the capacitive element C23.

The gate drive function 313 receives the gate drive voltage $V_{SW11}$ accumulated in the capacitive element C23 at the power input node. The gate drive function 313 can generate the control signals $CS_{SW11}$ of the active level Va13 and the non-active level Vna13 shown in Equations 13 and 14 according to the gate drive signal $GD_{SW11}$ and supply the same to the gate of the switching element SW11. That is, the control circuit 310 can control the gate voltage of the switching element SW11 so as to be maintained at $V_{H13}$ or $V_{L13}$ with reference to the source.

The gate drive power supply function 324 generates the gate drive voltage $V_{SW12}$ and supplies the same to the gate drive function 314. The gate drive voltage $V_{SW12}$ corresponds to the gate voltage $V_{H14}$ that turns on the switching element SW12, and for example, $$V_{H14} \approx V_{SW12}.$$

The gate drive power supply function 324 generates the gate drive voltage $V_{SW12}$ (for example, 15 V) using the voltage Vcont2, and accumulates the gate drive voltage $V_{SW12}$ in the capacitive element C24.

The gate drive function 314 receives the gate drive voltage $V_{SW12}$ accumulated in the capacitive element C24 at the power input node. The gate drive function 314 can generate the control signals $CS_{SW12}$ of the active level Va14 and the non-active level Vna14 shown in Equations 15 and 16 according to the gate drive signal $GD_{SW12}$ and supply the same to the gate of the switching element SW12. That is, the control circuit 310 can control the gate voltage of the switching element SW12 so as to be maintained at $V_{H14}$ or $V_{L14}$ with reference to the source.

Figure 9A:
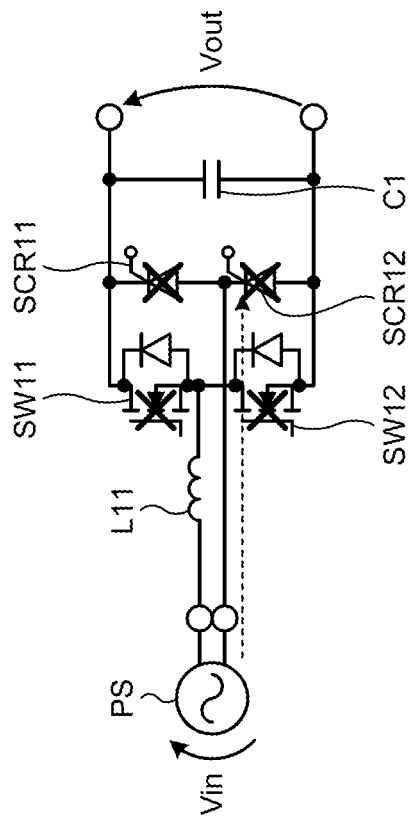
FIGS. 9A to 9D are diagrams illustrating a startup operation of the switching power supply device according to the second embodiment.
Figure 9C:
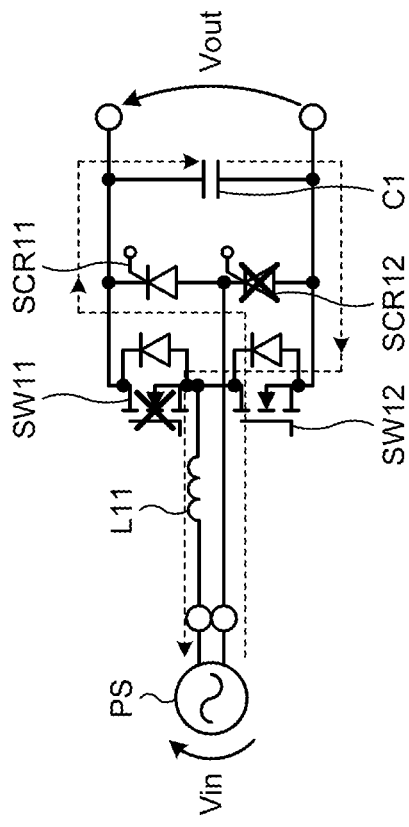
Figure 9B:
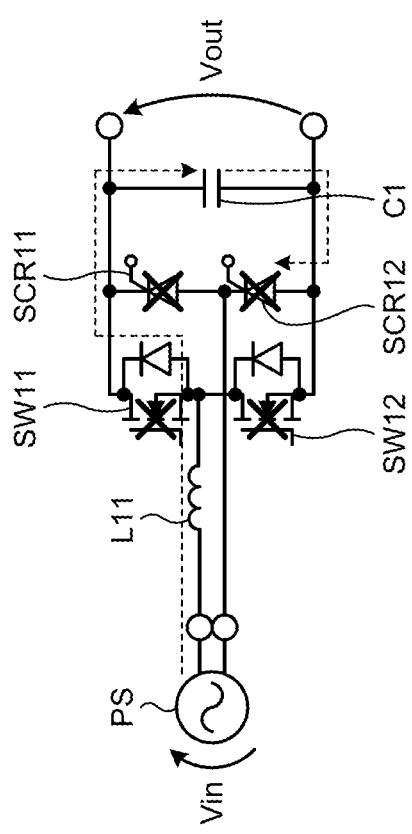
Figure 9D:
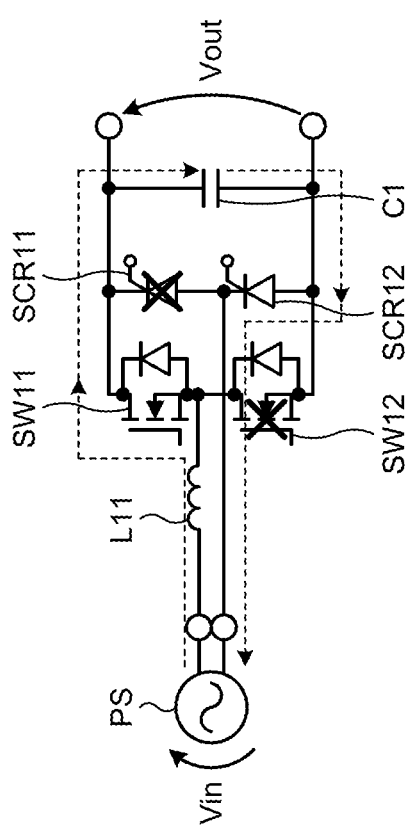

Further, as illustrated in FIGS. 8 to 9D, the operation is different from that of the first embodiment in startup of the switching power supply device 301 in the following points. FIG. 8 is a waveform diagram illustrating the startup operation of the switching power supply device 301. FIGS. 9A to 9D are diagrams illustrating the startup operation of the switching power supply device 301.

At the timing t21, the supply of the input voltage Vin to the input nodes Nin1 and Nin2 is started.

In the period $T_{11}$ of timings t21 to t22, the control circuit 310 maintains at least the gate voltages of the thyristor SCR12 and the switching element SW12 at $V_{L12}$ and $V_{L14}$, respectively, in response to the tendency of the absolute amplitude value of the input voltage Vin to increase. The gate voltages of the thyristor SCR11 and the switching element SW11 may be $V_{L11}$, $V_{L13}$ or $V_{H11}$, $V_{H13}$, respectively. The control circuit 310 compares the absolute amplitude value of the input voltage Vin with the threshold value Vth1 when the absolute amplitude value of the input voltage Vin tends to decrease. The control circuit 310 maintains at least the gate voltages of the thyristor SCR12 and the switching element SW12 at $V_{L12}$ and $V_{L14}$, respectively, in response to the absolute amplitude value of the input voltage Vin being larger than the threshold value Vth1. The gate voltages of the thyristor SCR11 and the switching element SW11 may be $V_{L11}$, $V_{L13}$ or $V_{H11}$, $V_{H13}$, respectively. As a result, at least the thyristor SCR12 and the switching element SW12 are maintained in the off state in the period $T_{11}$, as illustrated in FIG. 9A, no current flows from the AC power supply PS, and the output voltage Vout generated by the capacitive element C1 is maintained at the initial value V0 ($\approx$0 V).

At the timing t22, the control circuit 310 changes the gate voltage of the thyristor SCR12 from $V_{L12}$ to $V_{H12}$ in response to the absolute amplitude value of the input voltage Vin reaching the threshold value Vth1. At this time, from the viewpoint of improving circuit efficiency, it is preferable to change the gate voltage of the switching element SW11 from $V_{L13}$ to $V_{H13}$. The gate voltage of the switching element SW12 may be maintained at $V_{L14}$, and the gate voltage of the thyristor SCR11 may be $V_{L11}$ or $V_{H11}$.

In the period $T_{12}$ of the timings t22 to t23, the control circuit 310 maintains the gate voltage of the switching element SW12 at $V_{L14}$ in response to the absolute amplitude value of the input voltage Vin being equal to or less than the threshold value Vth1, and maintains the gate voltages of the thyristor SCR12 and the switching element SW11 at $V_{H12}$ and $V_{H13}$, respectively. As a result, in the period $T_{12}$, as illustrated in FIG. 9B, current flows in the path of AC power supply PS→induction element L11→switching element SW11→capacitive element C1→thyristor SCR12→AC power supply PS, electric charges are accumulated in the capacitive element C1, and the output voltage Vout generated by the capacitive element C1 rises from V0 to V1. When the switching element SW11 is an N-channel MOSFET, the gate voltage may be maintained at $V_{L13}$ because the parasitic diode is provided as described in the first embodiment. This is because the current flows through the parasitic diode.

In the period $T_{21}$ of timings t23 to t24, the control circuit 310 maintains at least the gate voltages of the thyristor SCR11 and the switching element SW11 at $V_{L11}$ and $V_{L13}$, respectively, in response to the tendency of the absolute amplitude value of the input voltage Vin to increase. The gate voltages of the thyristor SCR12 and the switching element SW12 may be $V_{L12}$, $V_{L14}$ or $V_{H12}$, $V_{H14}$, respectively. The control circuit 310 compares the absolute amplitude value of the input voltage Vin with the threshold value Vth2 when the absolute amplitude value of the input voltage Vin tends to decrease. The control circuit 310 maintains the gate voltages of the thyristor SCR11 and the switching element SW11 at $V_{L11}$ and $V_{L13}$, respectively, in response to the absolute amplitude value of the input voltage Vin being larger than the threshold value Vth2. As a result, in the period $T_{21}$, as illustrated in FIG. 9C, the thyristor SCR11 and the switching element SW11 are each maintained in the off state, no current flows from the AC power supply PS, and the output voltage Vout generated by the capacitive element C1 is maintained at V1. The gate voltages of the thyristor SCR12 and the switching element SW12 may be $V_{L12}$, $V_{L14}$ or $V_{H12}$, $V_{H14}$, respectively.

At the timing t24, the control circuit 310 changes the gate voltage of the thyristor SCR11 from $V_{L11}$ to $V_{H11}$ in response to the absolute amplitude value of the input voltage Vin reaching the threshold value Vth2. At this time, from the viewpoint of improving circuit efficiency, it is preferable to change the gate voltage of the switching element SW12 from $V_{L14}$ to $V_{H14}$. The gate voltage of the switching element SW11 may be maintained at $V_{L13}$, and the gate voltage of the thyristor SCR12 may be $V_{L12}$ or $V_{H12}$.

In the period $T_{22}$ of the timings t24 to t25, the control circuit 310 maintains at least the gate voltages of the thyristor SCR11 and the switching element SW12 at $V_{H11}$ and $V_{H14}$, respectively, in response to the absolute amplitude value of the input voltage Vin being equal to or less than the threshold value Vth2. As a result, in the period $T_{22}$, as illustrated in FIG. 9D, current flows in the path of AC power supply PS→thyristor SCR11→capacitive element C1→switching element SW12→induction element L11→AC power supply PS, and electric charges are accumulated in the capacitive element C1, and the output voltage Vout generated by the capacitive element C1 rises from V1 to V2. When the switching element SW12 is an N-channel MOSFET, the gate voltage may be maintained at $V_{L14}$ because the parasitic diode is provided as described in the first embodiment. This is because the current flows through the parasitic diode.

In the period $T_{31}$ of the timings t25 to t26, the same operation as in the period $T_{11}$ of the timings t21 to t22 is performed. In the period $T_{32}$ of the timings t26 to t27, the same operation as in the period $T_{12}$ of the timings t22 to t23 is performed. In the period $T_{41}$ of the timings t27 to t28, the same operation as in the period $T_{21}$ of the timings t23 to t24 is performed. In the period $T_{42}$ of the timings t28 to t29, the same operation as in the period $T_{22}$ of the timings t24 to t25 is performed.

At the timing t29, the control circuit 310 ends the startup operation and switches to the steady-state operation when the output voltage Vout reaches the desired voltage V4. As for the steady-state operation, substantially the same operation as that of the first embodiment can be performed.

Figure 10C:
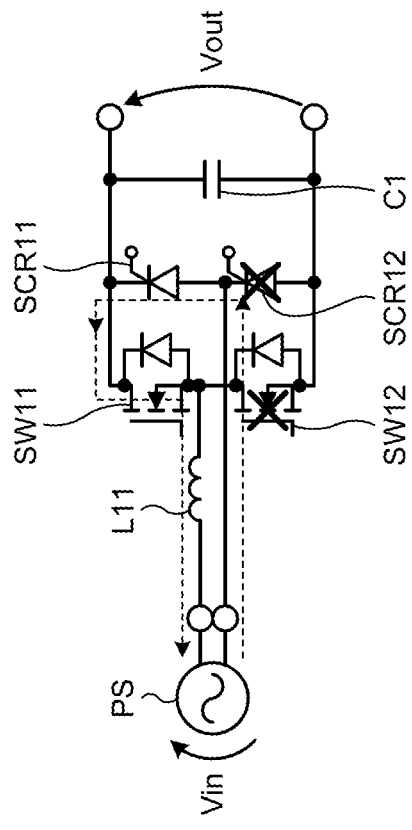
FIGS. 10A to 10D are diagrams illustrating a steady-state operation of the switching power supply device according to the second embodiment.

That is, the control circuit 310 maintains the gate voltages of the thyristor SCR11 and the thyristor SCR12 at $V_{L11}$ and $V_{H12}$, respectively, when the timing is within the odd-numbered half-cycle $T_5$. Further, the control circuit 310 alternately switches the gate voltage of the switching element SW12 between $V_{H14}$ and $V_{L14}$ and alternately switches the gate voltage of the switching element SW11 between $V_{L13}$ and $V_{H13}$. The gate voltages of the switching element SW12 and the switching element SW11 do not become $V_{H14}$ and $V_{H13}$ at the same time. As a result, the thyristor SCR11 is maintained in the off state, the thyristor SCR12 is maintained in the on state, the switching element SW12 is turned on/off, and the switching element SW11 is turned off/on, whereby the operations of FIGS. 10A and 10B are repeated alternately. That is, as illustrated in FIG. 10A, current flows in the path of AC power supply PS→induction element L11→switching element SW12→thyristor SCR12→AC power supply PS, and electromagnetic energy is accumulated in the induction element L11. Subsequently, as illustrated in FIG. 10B, current flows in the path of the AC power supply PS→the induction element L11→the switching element SW11→the capacitive element C1→the thyristor SCR12→the AC power supply PS, current is injected into the capacitive element C1, and the output voltage Vout approaches a predetermined value. Since the load circuit LD is connected, the current is supplied from the capacitive element C1 to the load LD regardless of whether the switching element SW12 and the switching element SW11 are turned on or off, so that the output voltage Vout always gradually decreases. Therefore, in detail, an operation in which the voltage Vout of the capacitive element C1 gradually decreases during the period in which the switching element SW12 is turned on, and rapidly increases during the period in which the switching element SW12 is turned off is repeated.

The control circuit 310 maintains the gate voltages of the thyristor SCR11 and the thyristor SCR12 at $V_{H11}$ and $V_{L12}$, respectively, when the timing is within the even-numbered half-cycle $T_6$. Further, the control circuit 310 alternately switches the gate voltage of the switching element SW11 between $V_{H13}$ and $V_{L13}$ and at the same time alternately switches the gate voltage of the switching element SW12 between $V_{L14}$ and $V_{H14}$. The gate voltages of the switching element SW11 and the switching element SW12 do not become $V_{H13}$ and $V_{H14}$ at the same time. As a result, the thyristor SCR12 is maintained in the off state, the thyristor SCR11 is maintained in the on state, the switching element SW11 is turned on/off, and the switching element SW12 is turned off/on, whereby the operation of FIGS. 10C and 10C is repeated alternately. That is, as illustrated in FIG. 10C, current flows in the path of AC power supply PS→thyristor SCR11→switching element SW11→induction element L11→AC power supply PS, and electromagnetic energy is accumulated in the induction element L11.

Figure 10D:
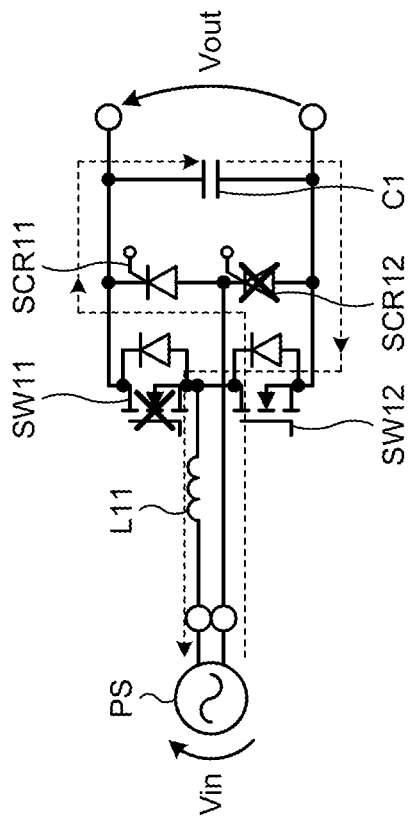
Figure 10A:
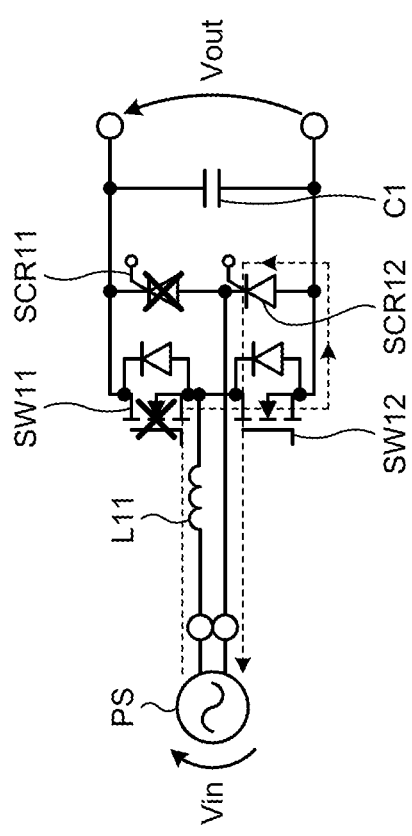
Figure 10B:
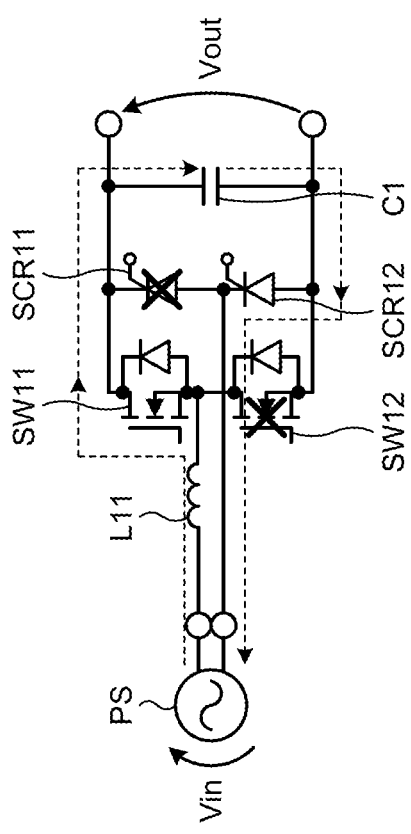

Subsequently, as illustrated in FIG. 10D, current flows in the path of AC power supply PS→thyristor SCR11→capacitive element C1→switching element SW12→induction element L11→AC power supply PS, and current is injected into the capacitive element C1, and the output voltage Vout approaches a predetermined value. Since the load circuit LD is connected, the current is supplied from the capacitive element C1 to the load LD regardless of whether the switching element SW11 is turned on or off, so that the output voltage Vout always gradually decreases. Therefore, in detail, an operation in which the voltage Vout of the capacitive element C1 gradually decreases during the period in which the switching element SW11 is turned on, and rapidly increases during the period in which the switching element SW11 is turned off is repeated. Subsequently, the operation in the odd-numbered half-cycle $T_7$ is the same as the operation in the half-cycle $T_5$ in the period of timings t11 to t12, and the operation in the even-numbered half-cycle $T_8$ is the same as the operation in the half-cycle $T_6$ in the period of timings t12 to t13.

As described above, in the second embodiment, the switching power supply device 301 performs control using the input voltage Vin itself detected at startup, and selectively turns on the thyristor SCR11 or SCR12 during the period in which the absolute amplitude value is smaller than the threshold value. As a result, the control for suppressing the inrush current at startup can be simplified as compared with the case of performing complicated control such as calculating the phase angle of the input voltage.

Further, in the second embodiment, the control for suppressing the inrush current at startup can be simplified as compared with the case of performing complicated control such as calculating the phase angle of the input voltage, so that the configuration of the control circuit 310 can be simplified.

Since the switching power supply device 301 is a bridgeless type, the number of elements of the diode, thyristor, and transistor through which the current path passes can be reduced as compared with the switching power supply device 1 of the first embodiment. For example, in FIGS. 3B and 3D, the number of elements through which the current path passes is three, whereas in FIGS. 9B and 9D, the number of elements through which the current path passes is only two. As a result, the switching power supply device 301 can reduce the power loss due to elements.

Figure 11:
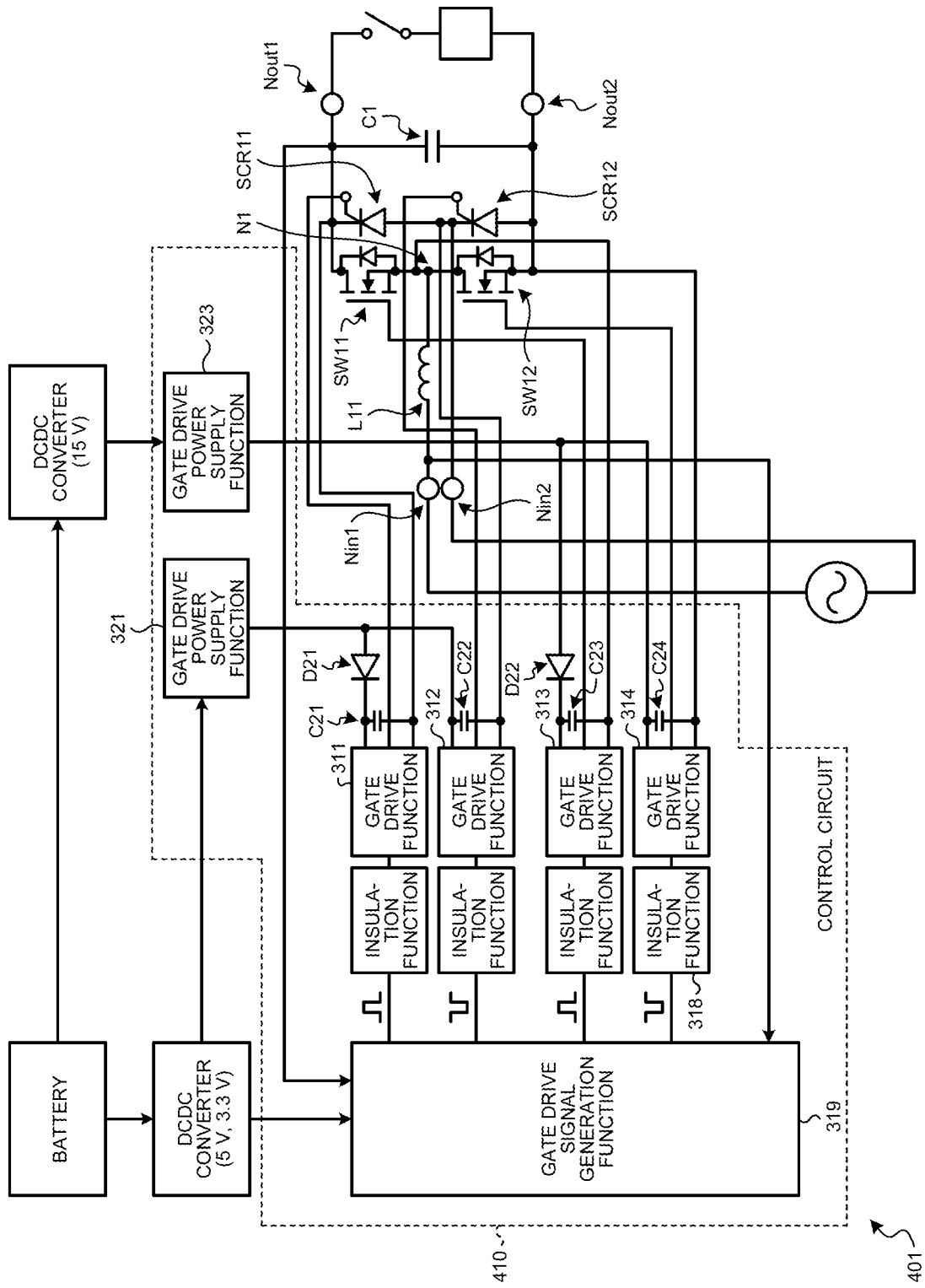
FIG. 11 is a diagram illustrating a configuration of a switching power supply device according to a first modification of the second embodiment.

Further, as a first modification of the second embodiment, as illustrated in FIG. 11, a switching power supply device 401 has a configuration in which the gate drive power supply function is shared for a plurality of gate drive functions. FIG. 11 is a diagram illustrating a configuration of the switching power supply device 401 according to the first modification of the second embodiment. For example, a diode D21 is added between the gate drive power supply function 321 and the gate drive function 311 and a diode D22 is added between the gate drive power supply function 323 and the gate drive function 313. In the diode D21, the cathode is connected to the gate drive function 311 and the anode is connected to the gate drive power supply function 321 and the gate drive function 312. That is, in a control circuit 410, the gate drive power supply function 321 is connected to the gate drive function 311 via the diode D21, and is connected to the gate drive function 312 without via the diode D21. In the diode D22, the cathode is connected to the gate drive function 313, and the anode is connected to the gate drive power supply function 323 and the gate drive function 314. That is, in the control circuit 410, the gate drive power supply function 323 is connected to the gate drive function 313 via the diode D22, and is connected to the gate drive function 314 without via the diode D22. The diodes D21 and D22 can prevent the current from flowing back from one set of ends of the capacitive elements C21 and C23 toward the gate drive power supply functions 321 and 323 when the potential at one set of ends of the capacitive elements C21 and C23 becomes higher than the gate drive voltage supplied from the gate drive power supply functions 321 and 323 to the gate drive function. That is, the gate drive power supply function 321 can be shared with the gate drive functions 311 and 312, and the gate drive power supply function 323 can be shared with the gate drive functions 313 and 314. As a result, the gate drive power supply functions 322 and 324 (see FIG. 18) can be omitted, so that the configuration of the control circuit 410 can be further simplified.

Figure 12:
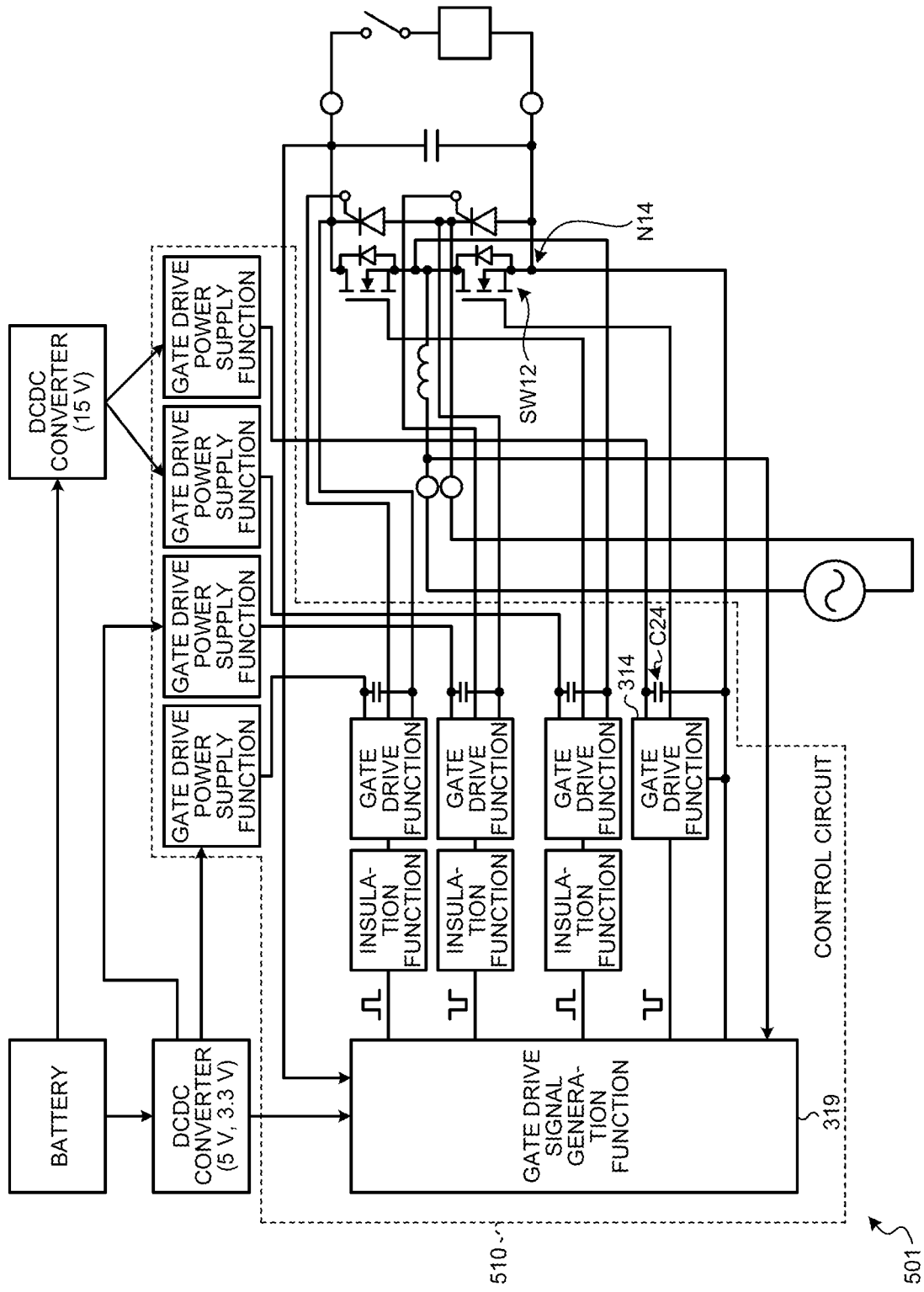
FIG. 12 is a diagram illustrating a configuration of a switching power supply device according to a second modification of the second embodiment.

Further, as a second modification of the second embodiment, a switching power supply device 501 may have a configuration in which the insulation function 318 (see FIG. 7) is omitted as illustrated in FIG. 12. FIG. 12 is a diagram illustrating a configuration of the switching power supply device 501 according to the second modification of the second embodiment. For example, in the configuration illustrated in FIG. 7, a line for electrically connecting the node N14 to the gate drive function 314 and the gate drive signal generation function 319 is added, and the other end of the capacitive element C24 is connected to the line. As a result, the gate drive signal generation function 319 can generate the gate drive signal $GD_{SW12}$ based on the source of the switching element SW12, and align the signal references of the gate drive signal generation function 319 and the gate drive function 314. Therefore, as illustrated in FIG. 12, the gate drive function 314 can be electrically connected to the gate drive signal generation function 319, and the gate drive signal $GD_{SW12}$ can be directly supplied from the gate drive signal generation function 319 to the gate drive function 314. That is, since the insulation function 318 (see FIG. 18) can be omitted, the configuration of a control circuit 510 can be further simplified.

Figure 13:
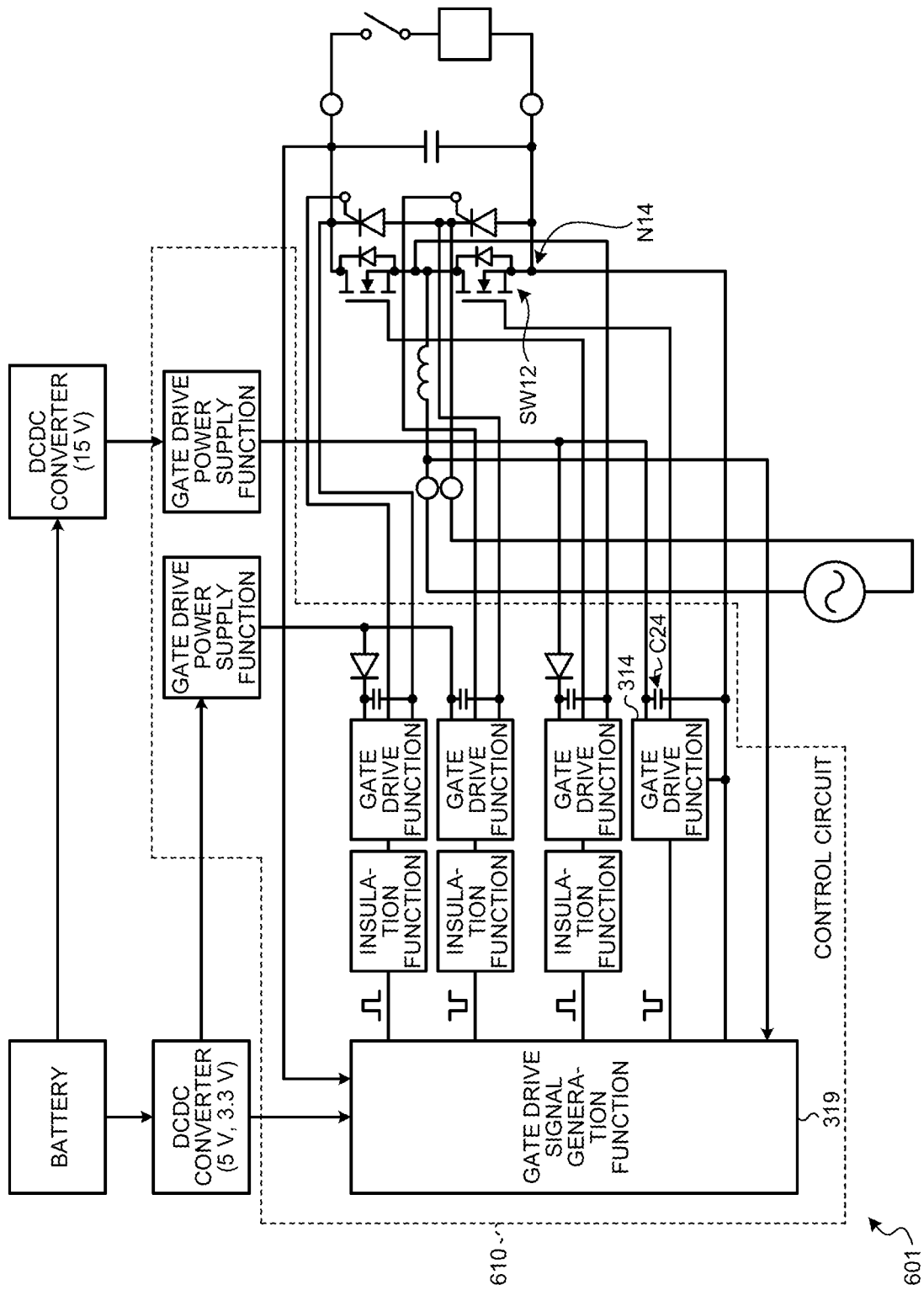
FIG. 13 is a diagram illustrating a configuration of a switching power supply device according to a third modification of the second embodiment.

Further, as a third modification of the second embodiment, a switching power supply device 601 may have a configuration in which the insulation function 318 (see FIG. 11) is omitted as illustrated in FIG. 13. FIG. 13 is a diagram illustrating a configuration of the switching power supply device 601 according to the third modification of the second embodiment. For example, in the configuration illustrated in FIG. 11, a line for electrically connecting the node N14 to the gate drive function 314 and the gate drive signal generation function 319 is added, and the other end of the capacitive element C24 is connected to the line. As a result, the gate drive signal generation function 319 can generate the gate drive signal $GD_{SW12}$ based on the source of the switching element SW12, and align the signal references of the gate drive signal generation function 319 and the gate drive function 314. Therefore, as illustrated in FIG. 13, the gate drive function 314 can be electrically connected to the gate drive signal generation function 319, and the gate drive signal $GD_{SW12}$ can be directly supplied from the gate drive signal generation function 319 to the gate drive function 314. That is, since the insulation function 318 (see FIG. 11) can be omitted, the configuration of a control circuit 610 can be further simplified.

Figure 14:
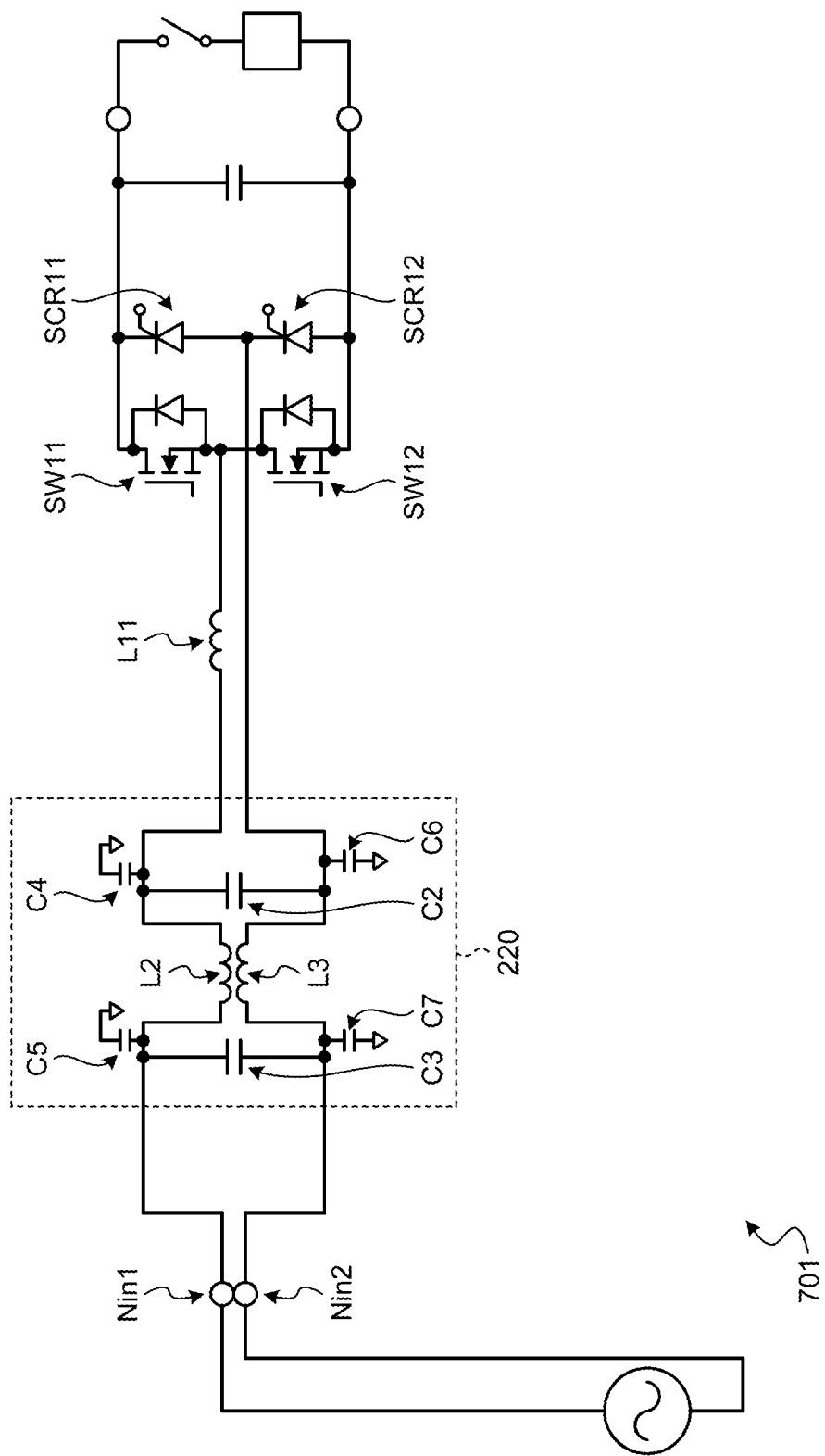
FIG. 14 is a diagram illustrating a configuration of a switching power supply device according to a fourth modification of the second embodiment.

Further, as a fourth modification of the second embodiment, a switching power supply device 701 may further include a noise filter 220 as illustrated in FIG. 14. FIG. 14 is a diagram illustrating the configuration of the switching power supply device 701 according to the fourth modification of the second embodiment, and the illustration of the control circuit is omitted for simplification. For example, a noise filter 220 is electrically connected between the input node Nin1 and the input node Nin2 and the induction element L11, the thyristor SCR11, the thyristor SCR12, the switching element SW11 and the switching element SW12.

The noise filter 220 includes common mode coils L2 and L3, line-to-line capacitors C2 and C3, and line-to-ground capacitors C4, C5, C6, and C7.

One end of the common mode coil L2 is connected to the input node Nin1, and the other end is connected to the node between the switching element SW11 and the switching element SW12 via the induction element L11. One end of the common mode coil L3 is connected to the input node Nin2, and the other end is connected to the node between the thyristor SCR11 and the thyristor SCR12. The common mode coils L2 and L3 are configured to be wound in phase with each other on the core, and cancel the magnetic fluxes of the current flowing through the coils and attenuate the common mode noise.

One set of ends of the line-to-line capacitors C2 and C3 are connected to the line connecting the input node Nin1 and the induction element L11, and the other set of ends are connected to the line connecting the input node Nin2 and the thyristors SCR11 and SCR12.

The line-to-line capacitors C2 and C3 can bypass noise between lines and attenuate normal mode noise.

One set of ends of the line-to-ground capacitors C4 and C5 are connected to the line connecting the input node Nin1 and the induction element L11, and the other set of ends are connected to the ground potential. The line-to-ground capacitors C4 and C5 can bypass noise to the ground potential and attenuate common mode noise.

One set of ends of the line-to-ground capacitors C6 and C7 are connected to the line connecting the input node Nin2 and the thyristors SCR11 and SCR12, and the other set of ends are connected to the ground potential. The line-to-ground capacitors C6 and C7 can bypass noise to the ground potential and attenuate common mode noise.

As described above, the switching power supply device 701 can suppress the radiation of noise to the outside and can reduce the influence of the noise from the outside since it further includes the noise filter 220.

Third Embodiment

Next, a switching power supply device according to the third embodiment will be described. In the following, the parts different from the first embodiment and the second embodiment will be mainly described.

The second embodiment illustrates a configuration in which the nodes that serve as the reference for the gate voltages of the plurality of thyristors and the plurality of switching elements are different from each other, but in the third embodiment, a configuration in which the nodes that serve as the reference for the gate voltages of the plurality of thyristors and the plurality of switching elements are shared will be illustrated.

Figure 15:
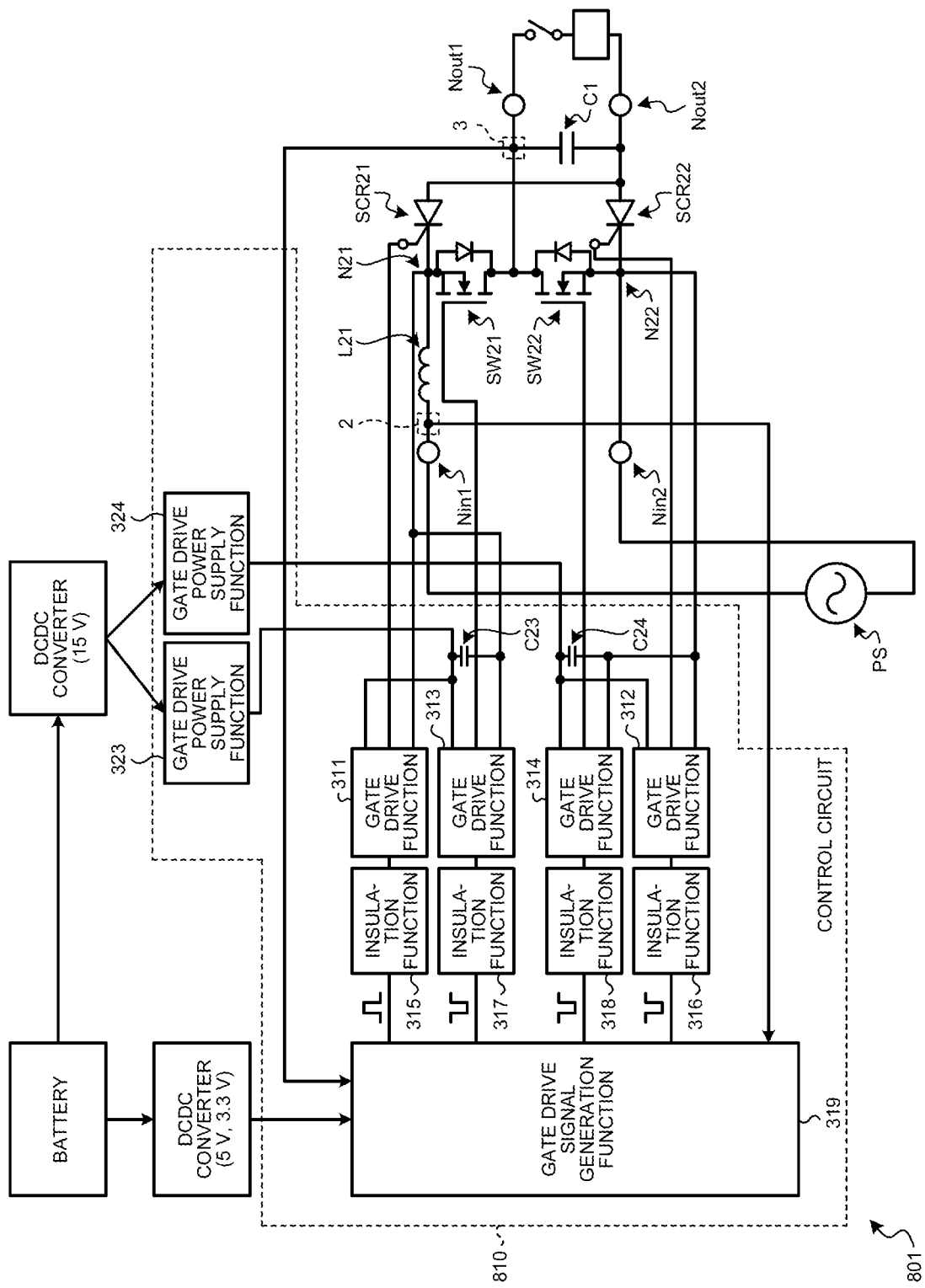
FIG. 15 is a diagram illustrating a configuration of a switching power supply device according to a third embodiment.

Specifically, as illustrated in FIG. 15, a switching power supply device 801 includes an induction element L21, thyristors SCR21 and SCR22, switching elements SW21 and SW22, and a control circuit 810 instead of the induction element L11, the thyristors SCR11 and SCR12, the switching elements SW11 and SW12, and the control circuit 310 (see FIG. 7).

The induction element L21 is electrically connected between the input node Nin1 and the node N21. One end of the induction element L21 is connected to the input node Nin1 and the other end is connected to the node N21.

The thyristor SCR21 is electrically connected between the node N21 and the output node Nout2. In the thyristor SCR21, the cathode is connected to the node N21, the anode is connected to the output node Nout2, and the gate is connected to the control circuit 810.

The thyristor SCR22 is electrically connected between the input node Nin2 and the output node Nout2. In the thyristor SCR22, the cathode is connected to the input node Nin2 via the node N22, the anode is connected to the output node Nout2, and the gate is connected to the control circuit 810.

The switching element SW21 is electrically connected between the node N21 and the output node Nout1. The switching element SW21 is, for example, an N-channel MOSFET transistor, in which the source is connected to the node N21, the drain is connected to the output node Nout1, and the gate is connected to the control circuit 810.

The switching element SW22 is electrically connected between the input node Nin2 and the output node Nout1. The switching element SW22 is, for example, an N-channel MOSFET transistor, in which the source is connected to the input node Nin2 via the node N22, the drain is connected to the output node Nout1, and the gate is connected to the control circuit 810.

As illustrated in FIG. 15, the thyristor SCR21 and the switching element SW21 share a common node that serves as a reference for the gate voltage. Both the cathode of the thyristor SCR21 and the source of the switching element SW21 are connected to the node N21. The thyristor SCR22 and the switching element SW22 have a common node that serves as a reference for the gate voltage. Both the cathode of the thyristor SCR22 and the source of the switching element SW22 are connected to the node N22.

Accordingly, the reference of the control signal of the thyristor SCR21 and the reference of the control signal of the switching element SW21 can be made common, and the reference of the control signal of the thyristor SCR22 and the reference of the control signal of the switching element SW22 can be made common, so that the configuration of the control circuit 810 can be simplified. In the control circuit 810, the gate drive power supply function 321, the gate drive power supply function 322, the capacitive element C21, and the capacitive element C22 are omitted from the control circuit 310 (see FIG. 7). One end of the capacitive element C23 is commonly connected to the power supply node of the gate drive function 311 and the power supply node of the gate drive function 313, and the other end is commonly connected to the reference node of the gate drive function 311 and the reference node of the gate drive function 313. One end of the capacitive element C23 is connected to the gate drive power supply function 323, and the other end is connected to the node N21. One end of the capacitive element C24 is commonly connected to the power supply node of the gate drive function 312 and the power supply node of the gate drive function 314, and the other end is commonly connected to the reference node of the gate drive function 312 and the reference node of the gate drive function 314. One end of the capacitive element C24 is connected to the gate drive power supply function 324, and the other end is connected to the node N22.

As in the second embodiment, the control circuit 810 controls the thyristor SCR21, the thyristor SCR22, the switching element SW21, and the switching element SW22 according to the input voltage Vin detected by the voltage detection unit 2 and the output voltage Vout detected by the voltage detection unit 3. The content of control by the control circuit 810 is the same as that of the second embodiment.

Figure 17A:
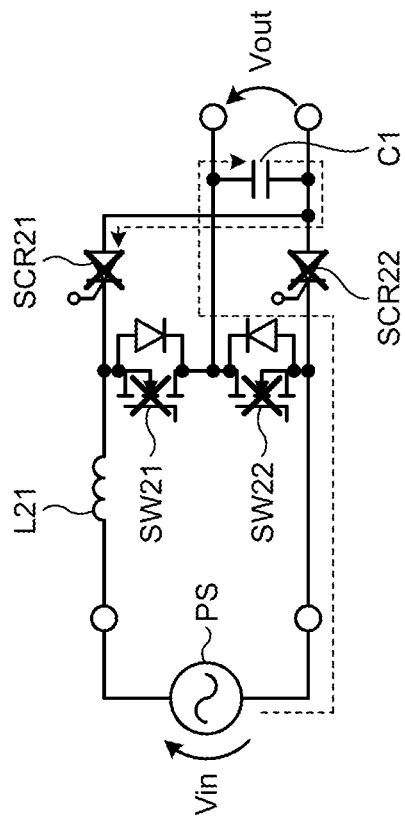
FIGS. 17A to 17D are diagrams illustrating a startup operation of the switching power supply device according to the third embodiment.
Figure 17B:
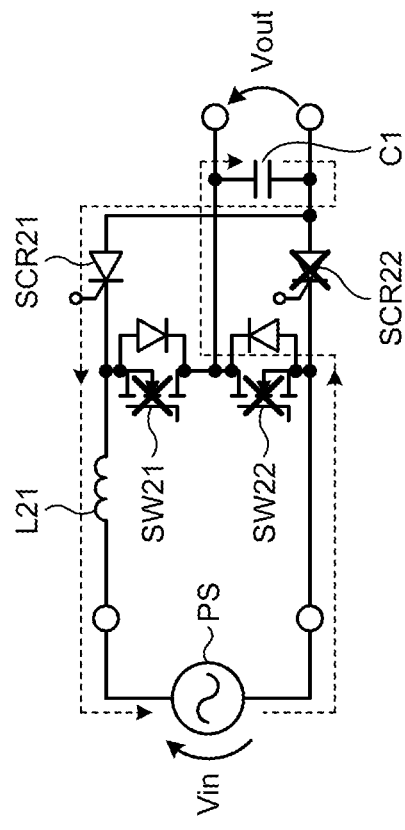
Figure 17C:
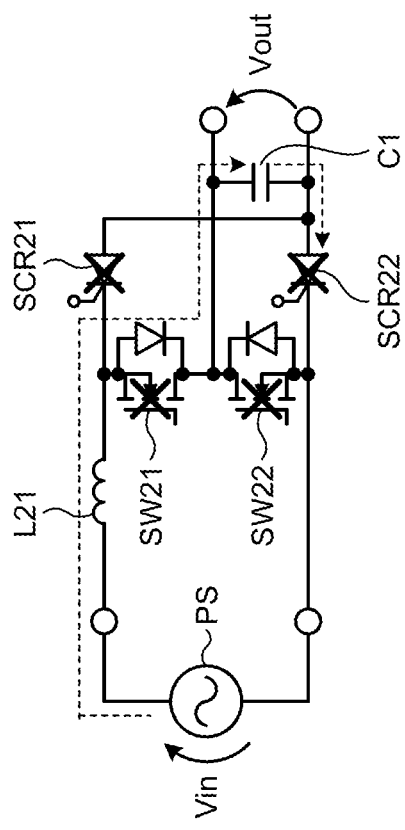
Figure 17D:
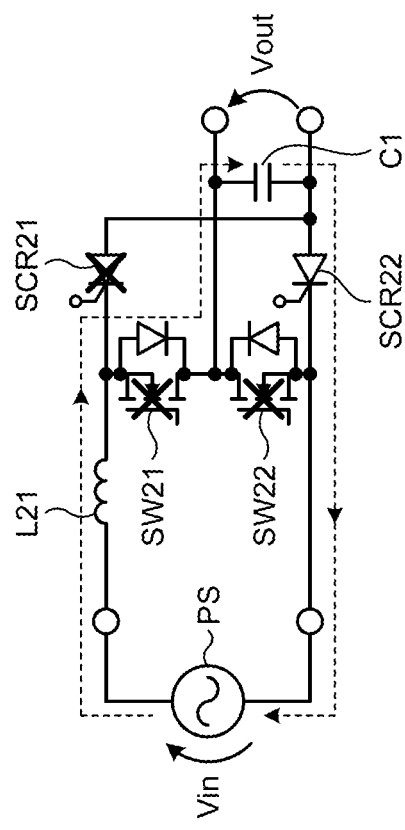

Further, the operation is the same as that of the second embodiment in startup of the switching power supply device 801 as illustrated in FIGS. 16 to 17D. FIG. 16 is a waveform diagram illustrating the startup operation of the switching power supply device 801. FIGS. 17A to 17D are diagrams illustrating the startup operation of the switching power supply device 801.

For example, in the period $T_{11}$ of the timings t31 to t32, the same operation as the period $T_{11}$ of the timings t21 to t22 (see FIG. 8) is performed. As a result, at least the thyristor SCR22 and the switching element SW22 are maintained in the off state in the period $T_{11}$, as illustrated in FIG. 17A, no current flows from the AC power supply PS, and the output voltage Vout generated by the capacitive element C1 is maintained at the initial value V0 ($\approx$0 V). Although the thyristor SCR21 and the switching element SW21 are shown in the off state in FIG. 17A, they may be in the on state.

In the period $T_{12}$ of the timings t32 to t33, the same operation as in the period $T_{12}$ of the timings t22 to t23 is performed. That is, the thyristor SCR22 is maintained in the on state, and the switching element SW22 is maintained in the off state. As a result, in the period $T_{12}$, as illustrated in FIG. 17B, current flows in the path of AC power supply PS→induction element L21→switching element SW21→capacitive element C1 thyristor SCR22→AC power supply PS, electric charges are accumulated in the capacitive element C1, and the output voltage Vout generated by the capacitive element C1 rises from V0 to V1. It is desirable to maintain the switching element SW21 in the ON state from the viewpoint of circuit efficiency.

In the period $T_{21}$ of the timings t33 to t34, the same operation as in the period $T_{21}$ of the timings t23 to t24 is performed. As a result, at least the thyristor SCR21 and the switching element SW21 are maintained in the off state in the period $T_{21}$, as illustrated in FIG. 17C, no current flows from the AC power supply PS, and the output voltage Vout generated by the capacitive element C1 is maintained at V1. Although the thyristor SCR22 and the switching element SW22 are shown in the off state in FIG. 17C, they may be in the on state. In the period $T_{22}$ of the timings t34 to t35, the same operation as that of the period $T_{22}$ of the timings t24 to t25 is performed. That is, the thyristor SCR21 is maintained in the on state and the switching element SW21 is maintained in the off state. As a result, in the period $T_{22}$, as illustrated in FIG. 17D, current flows in the path of AC power supply PS→switching element SW22→capacitive element C1 thyristor SCR21→induction element L21→AC power supply PS, electric charges are accumulated in the capacitive element C1, and the output voltage Vout generated by the capacitive element C1 rises from V1 to V2. It is desirable to maintain the switching element SW22 in the ON state from the viewpoint of circuit efficiency.

In the period $T_{31}$ of the timings t35 to t36, the same operation as in the period $T_{11}$ of the timings t31 to t32 is performed. In the period $T_{32}$ of the timings t36 to t37, the same operation as in the period $T_{12}$ of the timings t32 to t33 is performed. In the period T$_{41}$ of the timings t37 to t38, the same operation as in the period T$_{21}$ of the timings t33 to t34 is performed. In the period T$_{42}$ of the timings t38 to t39, the same operation as in the period T$_{22}$ of the timings t34 to t35 is performed.

At the timing t39, the control circuit 810 ends the startup operation and switches to the steady-state operation when the output voltage Vout reaches the desired voltage V4. As for the steady-state operation, substantially the same operation as that of the first embodiment can be performed.

As described above, in the third embodiment, the switching power supply device 801 performs control using the input voltage Vin itself detected at startup, and selectively turns on the thyristor SCR21 or SCR22 during a period in which the absolute amplitude value is smaller than the threshold value. As a result, the control for suppressing the inrush current at startup can be simplified as compared with the case of performing complicated control such as calculating the phase angle of the input voltage.

Further, in the third embodiment, since the control for suppressing the inrush current at startup can be simplified as compared with the case of performing complicated control such as calculating the phase angle of the input voltage, the configuration of the control circuit 810 for performing the control can be simplified.

Since the switching power supply device 801 is a bridgeless type, the number of elements of the diode, thyristor, and transistor through which the current path passes can be reduced as compared with the switching power supply device 1 of the first embodiment. For example, in FIGS. 3B and 3D, the number of elements through which the current path passes is three, whereas in FIGS. 17B and 17D, the number of elements through which the current path passes is only two. As a result, the switching power supply device 801 can reduce the power loss due to elements.

Figure 18:
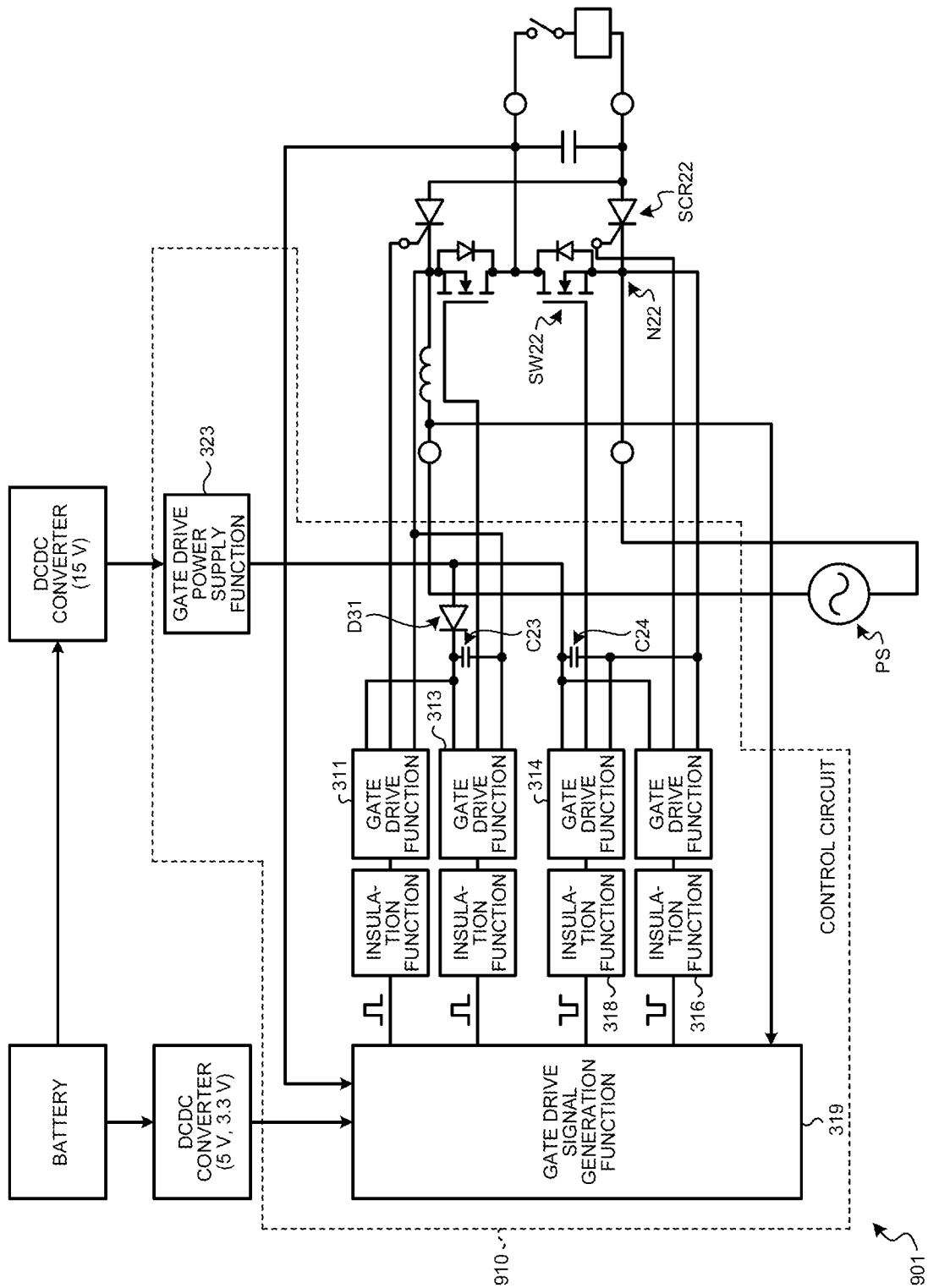
FIG. 18 is a diagram illustrating a configuration of a switching power supply device according to a first modification of the third embodiment.

Further, as a first modification of the third embodiment, as illustrated in FIG. 18, a switching power supply device 901 has a configuration in which the gate drive power supply function is shared for a plurality of gate drive functions. FIG. 18 is a diagram illustrating a configuration of the switching power supply device 901 according to the first modification of the third embodiment. For example, a diode D31 is added between the gate drive power supply function 323 and the gate drive functions 311 and 313. In the diode D31, the cathode is connected to the gate drive functions 311 and 313, and the anode is connected to the gate drive power supply function 323 and the gate drive functions 312 and 314. That is, in a control circuit 910, the gate drive power supply function 323 is connected to the gate drive functions 311 and 313 via the diode D31, and is connected to the gate drive functions 312 and 314 without via the diode D31. The diode D31 can prevent the current from flowing back from one end of the capacitive element C23 to the gate drive power supply function 323 when the potential at one end of the capacitive element C23 becomes higher than the gate drive voltage supplied from the gate drive power supply function 323 to the gate drive functions 312 and 314. That is, since the gate drive power supply function 324 (see FIG. 15) can be omitted, the configuration of the control circuit 910 can be further simplified.

Figure 19:
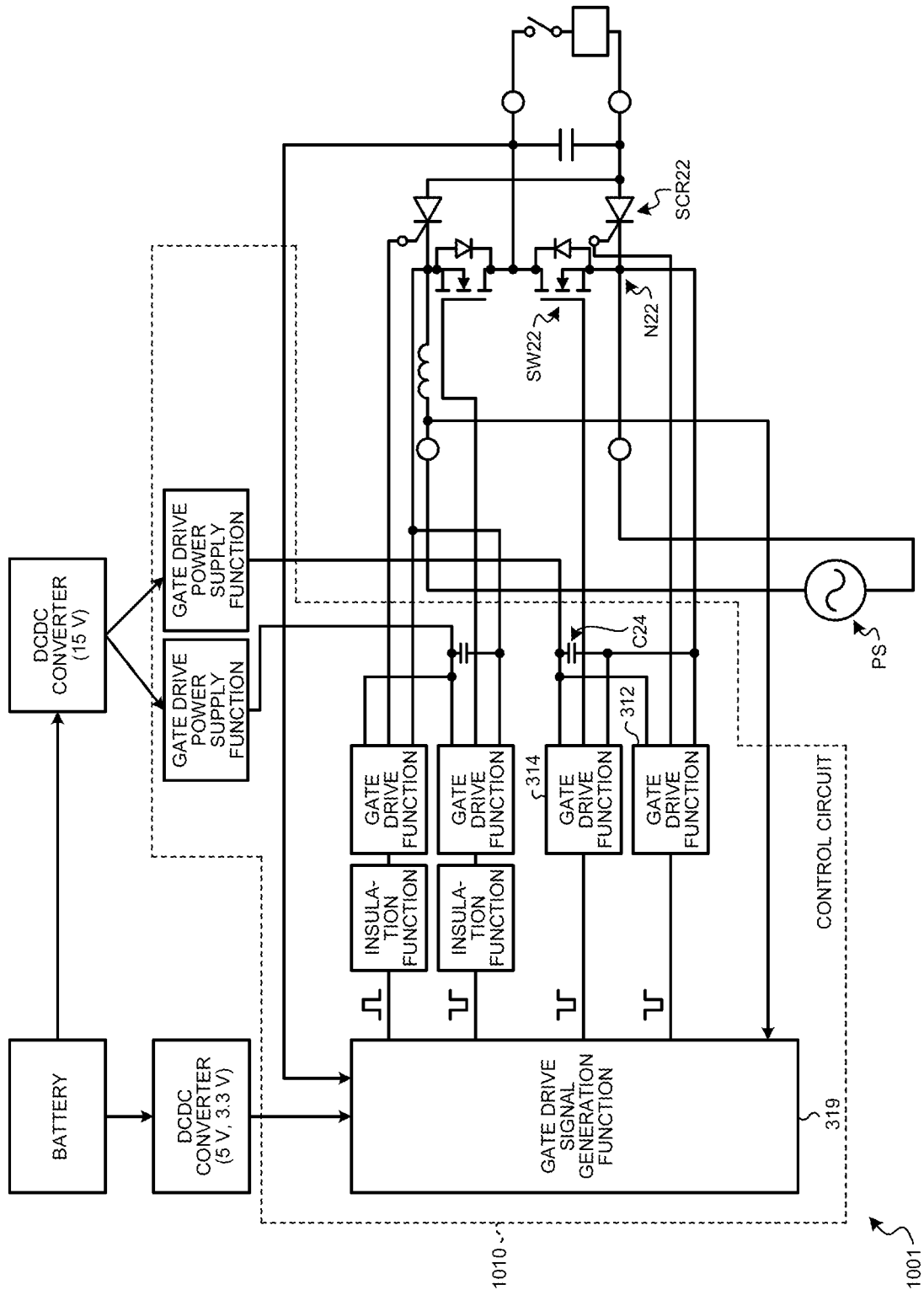
FIG. 19 is a diagram illustrating a configuration of a switching power supply device according to a second modification of the third embodiment.

Further, as a second modification of the third embodiment, a switching power supply device 1001 may have a configuration in which the insulation functions 316 and 318 (see FIG. 15) are omitted as illustrated in FIG. 19. FIG. 19 is a diagram illustrating a configuration of the switching power supply device 1001 according to the second modification of the third embodiment. For example, in the configuration illustrated in FIG. 15, a line for electrically connecting the node N22 to the gate drive functions 312 and 314 and the gate drive signal generation function 319 is added, and the other end of the capacitive element C24 is connected to the line. As a result, the gate drive signal generation function 319 can generate the gate drive signal GD$_{SCR22}$ based on the cathode of the thyristor SCR22, and the signal references of the gate drive signal generation function 319 and the gate drive function 312 can be aligned. Therefore, as illustrated in FIG. 19, the gate drive function 312 can be electrically connected to the gate drive signal generation function 319, and the gate drive signal GD$_{SCR22}$ can be directly supplied from the gate drive signal generation function 319 to the gate drive function 312. Similarly, the gate drive signal generation function 319 can generate the gate drive signal GD$_{SW22}$ based on the source of the switching element SW22, and the signal references of the gate drive signal generation function 319 and the gate drive function 314 can be aligned. Therefore, as illustrated in FIG. 19, the gate drive function 314 can be electrically connected to the gate drive signal generation function 319, and the gate drive signal GD$_{SW12}$ can be directly supplied from the gate drive signal generation function 319 to the gate drive function 314. That is, since the insulation functions 316 and 318 (see FIG. 15) can be omitted, the configuration of a control circuit 1010 can be further simplified.

Figure 20:
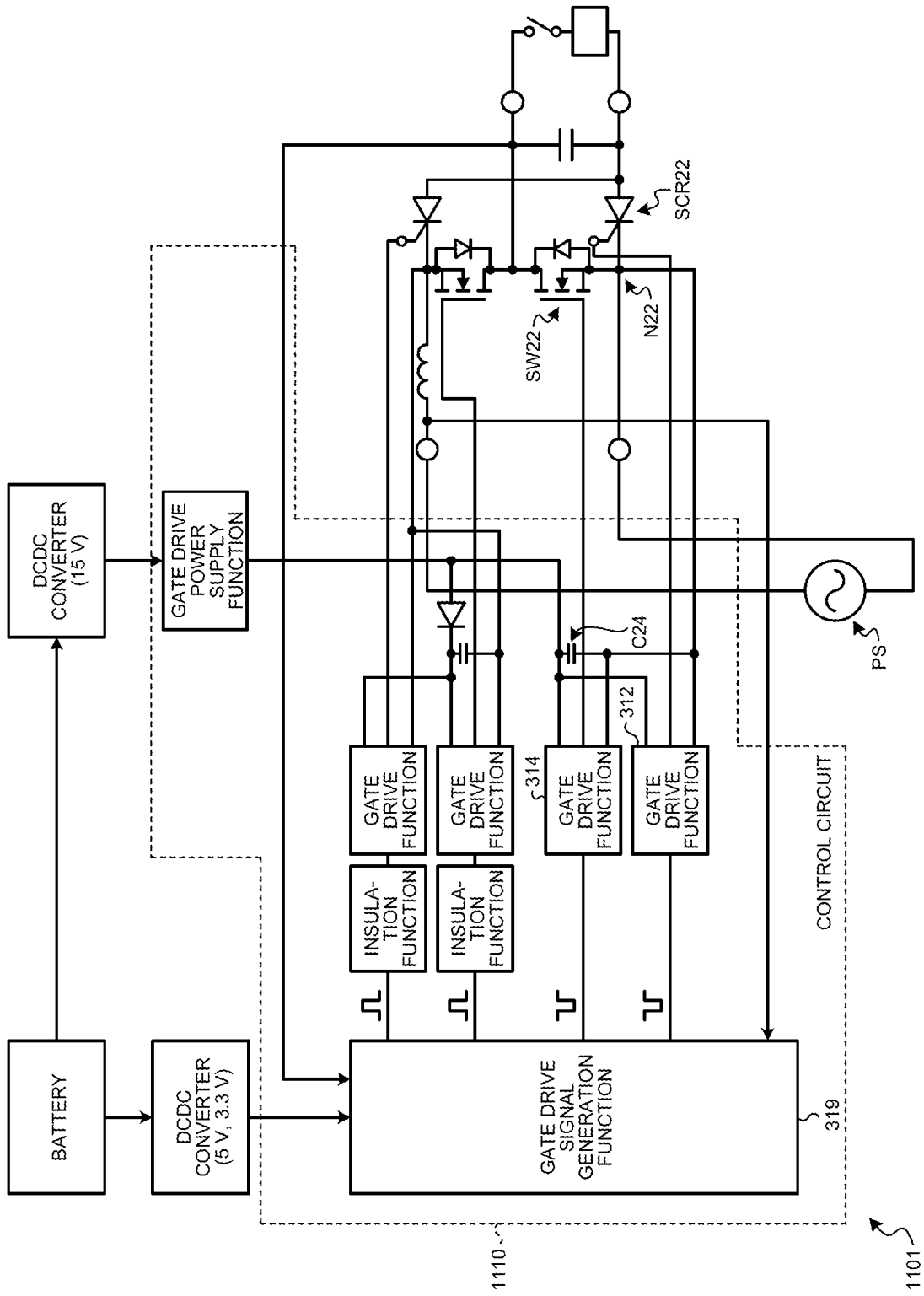
FIG. 20 is a diagram illustrating a configuration of a switching power supply device according to a third modification of the third embodiment.

Further, as a third modification of the third embodiment, a switching power supply device 1101 may have a configuration in which the insulation functions 316 and 318 (see FIG. 18) are omitted as illustrated in FIG. 20. FIG. 20 is a diagram illustrating a configuration of the switching power supply device 1101 according to the third modification of the third embodiment. For example, in the configuration illustrated in FIG. 18, a line for electrically connecting the node N22 to the gate drive functions 312 and 314 and the gate drive signal generation function 319 is added, and the other end of the capacitive element C24 is connected to the line. As a result, the gate drive signal generation function 319 can generate the gate drive signal GD$_{SCR22}$ based on the cathode of the thyristor SCR22, and the signal references of the gate drive signal generation function 319 and the gate drive function 312 can be aligned. Therefore, as illustrated in FIG. 20, the gate drive function 312 can be electrically connected to the gate drive signal generation function 319, and the gate drive signal GD$_{SCR22}$ can be directly supplied from the gate drive signal generation function 319 to the gate drive function 312. Similarly, the gate drive signal generation function 319 can generate the gate drive signal GD$_{SW22}$ based on the source of the switching element SW22, and the signal references of the gate drive signal generation function 319 and the gate drive function 314 can be aligned. Therefore, as illustrated in FIG. 20, the gate drive function 314 can be electrically connected to the gate drive signal generation function 319, and the gate drive signal GD$_{SW22}$ can be directly supplied from the gate drive signal generation function 319 to the gate drive function 314. That is, since the insulation functions 316 and 318 (see FIG. 18) can be omitted, the configuration of a control circuit 1110 can be further simplified.

Figure 21:
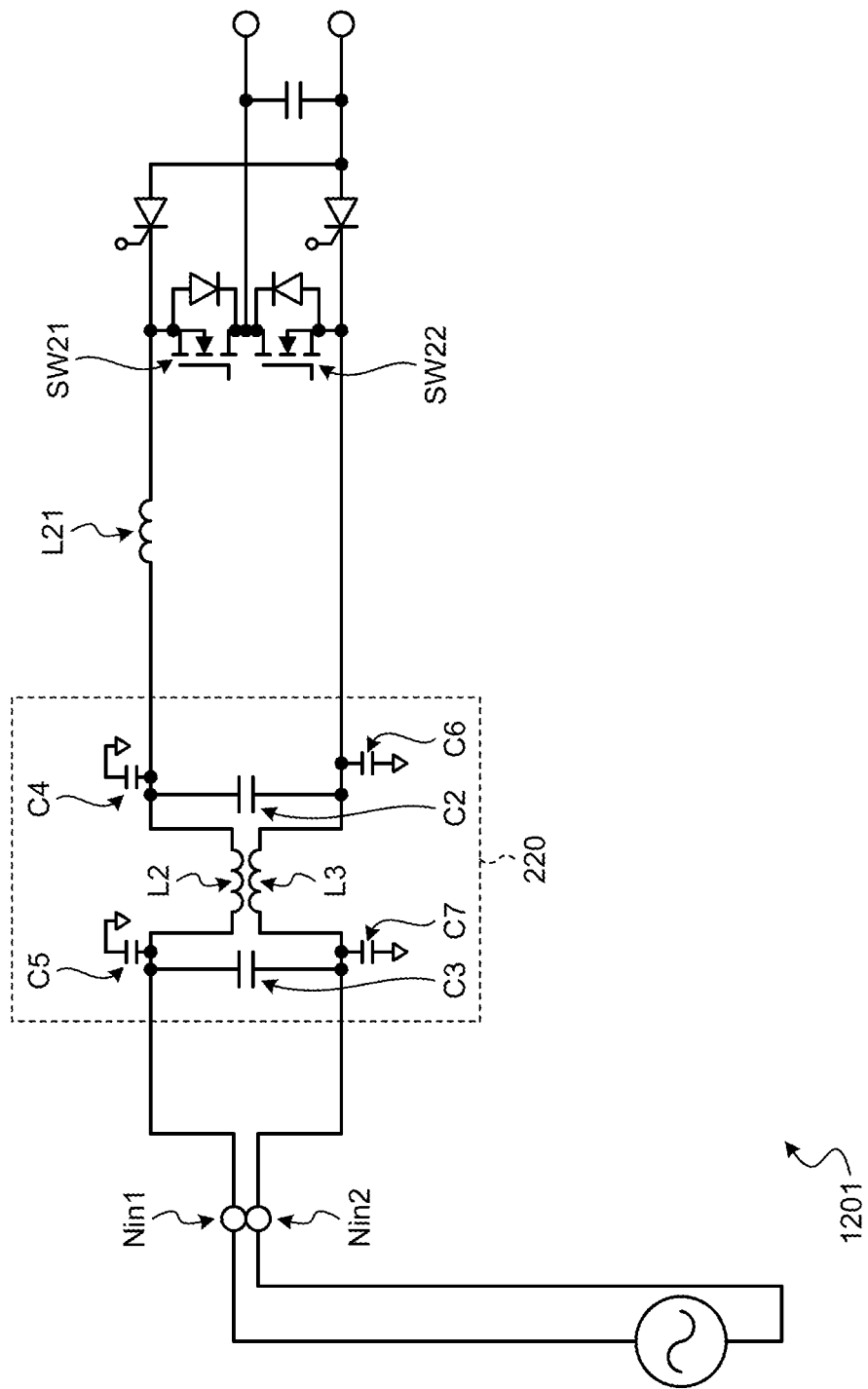
FIG. 21 is a diagram illustrating a configuration of a switching power supply device according to a fourth modification of the third embodiment.

Further, as a fourth modification of the third embodiment, a switching power supply device 1201 may further include a noise filter 220 as illustrated in FIG. 21. FIG. 21 is a diagram illustrating the configuration of the switching power supply device 1201 according to the fourth modification of the third embodiment, and the illustration of the control circuit is omitted for simplification. For example, a noise filter 220 is electrically connected between the input node Nin1 and the input node Nin2 and the induction element L21, the switching element SW21, and the switching element SW22. The noise filter 220 includes common mode coils L2 and L3, line-to-line capacitors C2 and C3, and line-to-ground capacitors C4, C5, C6, and C7.

One end of the common mode coil L2 is connected to the input node Nin1, and the other end is connected to the switching element SW21 via the induction element L21. One end of the common mode coil L3 is connected to the input node Nin2, and the other end is connected to the switching element SW22. The common mode coils L2 and L3 are configured to be wound in phase with each other on the core, and cancel the magnetic fluxes of the current flowing through the coils and attenuate the common mode noise.

One set of ends of the line-to-line capacitors C2 and C3 are connected to a line connecting the input node Nin1 and the induction element L21, and the other set of ends are connected to a line connecting the input node Nin2 and the switching element SW22. The line-to-line capacitors C2 and C3 can bypass noise between lines and attenuate normal mode noise.

One set of ends of the line-to-ground capacitors C4 and C5 are connected to the line connecting the input node Nin1 and the induction element L21, and the other set of ends are connected to the ground potential. The line-to-ground capacitors C4 and C5 can bypass noise to the ground potential and attenuate common mode noise.

One set of ends of the line-to-ground capacitors C6 and C7 are connected to the line connecting the input node Nin2 and the source of the watering element SW22, and the other set of ends are connected to the ground potential. The line-to-ground capacitors C6 and C7 can bypass noise to the ground potential and attenuate common mode noise.

As described above, the switching power supply device 1201 can suppress the radiation of noise to the outside and reduce the influence of the noise from the outside since it further includes the noise filter 220.

Although some embodiments of the present invention have been described, these embodiments are presented as examples and are not intended to limit the scope of the invention. These embodiments can be implemented in various other forms, and various omissions, replacements, and changes can be made without departing from the gist of the invention. These embodiments and modifications thereof are included in the scope and gist of the invention, as well as in the scope of the invention described in the claims and the equivalents thereof.

According to the switching power supply device according to the present disclosure, the inrush current can be suppressed by simple control.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A switching power supply device comprising:
   an induction element connected between a first input node and a first node;
   a first switching element connected between the first node and a first output node;
   a second switching element connected between the first node and a second output node;
   a first thyristor connected between a second input node and the first output node;
   a second thyristor connected between the second input node and the second output node;
   a capacitive element connected between the first output node and the second output node;
   a detector that detects an input voltage received via the first input node and the second input node; and
   a control circuit that controls the first thyristor, the second thyristor, the first switching element, and the second switching element according to the input voltage, wherein
   the control circuit maintains the second thyristor and the first switching element in an on state while maintaining the first thyristor and the second switching element in an off state in a first period in which an absolute amplitude value is equal to or less than a first threshold value within a latter half of a first half-cycle in the input voltage at startup, and maintains the first thyristor and the second switching element in an on state while maintaining the second thyristor and the first switching element in an off state in a second period in which an absolute amplitude value is equal to or less than a second threshold value within a latter half of a second half-cycle following the first half-cycle in the input voltage at startup.

2. The switching power supply device according to claim 1, wherein the control circuit maintains the first thyristor, the second thyristor, the first switching element, and the second switching element in an off state in a third period within the first half-cycle excluding the first period and maintains the first thyristor, the second thyristor, the first switching element, and the second switching element in an off state in a fourth period within the second half-cycle excluding the second period.

3. The switching power supply device according to claim 1, wherein the control circuit includes:
   a first drive unit that drives the first thyristor;
   a second drive unit that drives the second thyristor; and
   a drive power supply unit connected to one of the first drive unit and the second drive unit via a diode and connected to the other of the first drive unit and the second drive unit without via a diode.

4. The switching power supply device according to claim 1, wherein the control circuit includes:
   a third drive unit that drives the first switching element;
   a fourth drive unit that drives the second switching element; and
   a drive power supply unit connected to one of the third drive unit and the fourth drive unit via a diode and connected to the other of the third drive unit and the fourth drive unit without via a diode.

5. The switching power supply device according to claim 3, wherein the control circuit includes:
   a signal generation unit;
   a first insulation transmission unit that electrically insulates the signal generation unit and the first drive unit and transmits a signal generated by the signal generation unit to the first drive unit; and
   a second insulation transmission unit that electrically insulates the signal generation unit and the second drive unit and transmits the signal generated by the signal generation unit to the second drive unit.

6. The switching power supply device according to claim 4, wherein the control circuit includes:
a signal generation unit;
a third insulation transmission unit that electrically insulates the signal generation unit and the third drive unit and transmits a signal generated by the signal generation unit to the third drive unit; and
a fourth insulation transmission unit that electrically insulates the signal generation unit and the fourth drive unit and transmits the signal generated by the signal generation unit to the fourth drive unit.

7. The switching power supply device according to claim 4, wherein the control circuit includes:
a signal generation unit; and
a third insulation transmission unit that electrically insulates the signal generation unit and the third drive unit and transmits a signal generated by the signal generation unit to the third drive unit, wherein
the signal generation unit and the fourth drive unit are electrically connected to the second output node, and
the fourth drive unit is electrically connected to the signal generation unit, and the signal generated by the signal generation unit is transmitted to the fourth drive unit.

8. The switching power supply device according to claim 1, further comprising: a noise filter connected between the first input node and the second input node, and the first switching element, the second switching element, the first thyristor, and the second thyristor.

9. A switching power supply device comprising:
an induction element connected between a first input node and a first node;
a first switching element connected between the first node and a first output node;
a second switching element connected between a second input node and the first output node;
a first thyristor connected between the first node and a second output node;
a second thyristor connected between the second input node and the second output node;
a capacitive element connected between the first output node and the second output node;
a detector that detects an input voltage received via the first input node and the second input node; and
a control circuit that controls the first thyristor, the second thyristor, the first switching element, and the second switching element according to the input voltage, wherein
the control circuit maintains the second thyristor and the first switching element in an on state while maintaining the first thyristor and the second switching element in an off state in a first period in which an absolute amplitude value is equal to or less than a first threshold value within a latter half of a first half-cycle in the input voltage at startup, and maintains the first thyristor and the second switching element in an on state while maintaining the second thyristor and the first switching element in an off state in a second period in which an absolute amplitude value is equal to or less than a second threshold value larger than the first threshold value within a latter half of a second half-cycle following the first half-cycle in the input voltage at startup.

10. The switching power supply device according to claim 9, wherein the control circuit maintains the first thyristor, the second thyristor, the first switching element, and the second switching element in an off state in a third period within the first half-cycle excluding the first period and maintains the first thyristor, the second thyristor, the first switching element, and the second switching element in an off state in a fourth period within the second half-cycle excluding the second period.

11. The switching power supply device according to claim 9, wherein the control circuit includes:
a first drive unit that drives the first thyristor;
a second drive unit that drives the second thyristor;
a third drive unit that drives the first switching element;
a fourth drive unit that drives the second switching element; and
a drive power supply unit connected to the first drive unit and the third drive unit via a diode, and connected to the second drive unit and the fourth drive unit without via a diode.

12. The switching power supply device according to claim 11, wherein the control circuit includes:
a signal generation unit;
a first insulation transmission unit that electrically insulates the signal generation unit and the first drive unit and transmits a signal generated by the signal generation unit to the first drive unit;
a second insulation transmission unit that electrically insulates the signal generation unit and the second drive unit and transmits the signal generated by the signal generation unit to the second drive unit;
a third insulation transmission unit that electrically insulates the signal generation unit and the third drive unit and transmits the signal generated by the signal generation unit to the third drive unit; and
a fourth insulation transmission unit that electrically insulates the signal generation unit and the fourth drive unit and transmits the signal generated by the signal generation unit to the fourth drive unit.

13. The switching power supply device according to claim 11, wherein the control circuit includes:
a signal generation unit;
a first insulation transmission unit that electrically insulates the signal generation unit and the first drive unit and transmits a signal generated by the signal generation unit to the first drive unit; and
a third insulation transmission unit that electrically insulates the signal generation unit and the first drive unit and transmits the signal generated by the signal generation unit to the third drive unit, wherein
the signal generation unit and the second drive unit are electrically connected to the second output node,
the second drive unit is electrically connected to the signal generation unit, and the signal generated by the signal generation unit is transmitted to the second drive unit,
the signal generation unit and the fourth drive unit are electrically connected to the second output node, and
the fourth drive unit is electrically connected to the signal generation unit, and the signal generated by the signal generation unit is transmitted to the fourth drive unit.

14. The switching power supply device according to claim 9, further comprising a noise filter connected between the first input node and the second input node, and the first switching element and the second switching element.

15. A switching power supply device comprising:
first and second input nodes;
first and second output nodes;
an induction element connected to the first input node;
a first switching element connected between the induction element and the first output node;

a second switching element connected between the induction element and the second output node, the first and second switching elements being connected to each other;

a first thyristor connected between the second input node and the first output node;

a second thyristor connected between the second input node and the second output node, the first and second thyristors being connected to each other;

a capacitive element connected between the first output node and the second output node;

a voltage detector configured to detect an input voltage on the first and second input nodes; and a control circuit configured to:

switching element to an on state and the first thyristor and the second switching element to an off state, in a first period in which an absolute amplitude value of the input voltage is equal to or less than a first threshold value; and set the first thyristor and the second switching element to an on state and the second thyristor and the first switching element to off state in a second period in which an absolute amplitude value of the input voltage is equal to or less than a second threshold value.

16. The switching power supply device according to claim 15, wherein the first period is within a first half cycle of the input voltage, the second period is within a second half cycle of the input voltage, and the control circuit is configured to:

set the first thyristor, the second thyristor, the first switching element, and the second switching element to an off state in a third period within the first half cycle excluding the first period; and set the first thyristor, the second thyristor, the first switching element, and the second switching element to an off state in a fourth period within the second half cycle excluding the second period.

17. The switching power supply device according to claim 15, wherein the control circuit includes:

a first driver configured to drive the first thyristor;

a second driver configured to drive the second thyristor; and a first drive power supply connected to one of the first driver and the second driver with a diode, and connected to the other of the first driver and the second driver without a diode.

18. The switching power supply device according to claim 17, wherein the control circuit includes:

a third driver configured to drive the first switching element;

a fourth driver configured to drive the second switching element; and a second drive power supply connected to one of the third driver and the fourth driver with a diode, and connected to the other of the third driver and the fourth driver without a diode.

19. The switching power supply device according to claim 18, wherein the control circuit includes:

a signal generator;

a first insulator transmitter configured to electrically insulate the signal generator and the first driver, and transmit a signal generated by the signal generator to the first driver; and a second insulation transmitter configured to electrically insulate the signal generator and the second driver, and transmit a signal generated by the signal generator to the second driver.

\* \* \* \* \*